(12) United States Patent
Prest et al.

(10) Patent No.: US 10,180,732 B2
(45) Date of Patent: Jan. 15, 2019

(54) GIMBALLED SCROLL WHEEL

(75) Inventors: Christopher D. Prest, Mountain View, CA (US); Fletcher R. Rothkopf, Los Altos, CA (US); Richard Hung Minh Dinh, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 13/605,544

(22) Filed: Sep. 6, 2012

(65) Prior Publication Data

US 2013/0063379 A1    Mar. 14, 2013

Related U.S. Application Data

(60) Continuation of application No. 13/544,527, filed on Jul. 9, 2012, which is a division of application No. 11/882,889, filed on Aug. 6, 2007, which is a continuation of application No. 11/812,383, filed on Jun. 18, 2007, now Pat. No. 8,274,479.

(60) Provisional application No. 60/850,662, filed on Oct. 11, 2006.

(51) Int. Cl.
*G06F 3/041* (2006.01)
*G06F 3/0338* (2013.01)
*G06F 3/0362* (2013.01)
*H01H 25/04* (2006.01)
*H01H 3/02* (2006.01)

(52) U.S. Cl.
CPC .......... *G06F 3/0338* (2013.01); *G06F 3/0362* (2013.01); *H01H 25/041* (2013.01); *H01H 2003/0293* (2013.01); *H01H 2025/048* (2013.01)

(58) Field of Classification Search
CPC ... G06F 3/0338; G06F 3/0362; H01H 25/041; H01H 2025/048; H01H 2003/0293
USPC .......................................... 345/173; 200/406
See application file for complete search history.

(56) References Cited

U.S. PATENT DOCUMENTS

| | | | |
|---|---|---|---|
| 1,061,578 A | 5/1913 | Wischhusen et al. |
| 2,063,276 A | 12/1936 | Thomas |
| 2,798,907 A | 7/1957 | Schneider |
| 2,903,229 A | 9/1959 | Landge |
| 2,945,111 A | 7/1960 | McCormick |
| 3,005,055 A | 10/1961 | Mattke |
| 3,965,399 A | 6/1976 | Walker et al. |

(Continued)

FOREIGN PATENT DOCUMENTS

| CA | 1243096 | 10/1988 |
|---|---|---|
| CA | 2 597 500 A1 | 8/2006 |

(Continued)

OTHER PUBLICATIONS www.apple.com Apple iPod Mini Jan. 6, 2004.*

(Continued)

*Primary Examiner* — Vinh T Lam
(74) *Attorney, Agent, or Firm* — Morrison & Foerster LLP

(57) ABSTRACT

An input device that includes both a movement detector, such as mechanical switch, and positional indicator, such as touch pad touch screen, and/or touch sensing housing is disclosed. These two input devices can be used substantially simultaneously to provide a command to the device. In this manner, different commands can be associated with depressing a moveable member in different areas and a single moveable member can perform like several buttons.

17 Claims, 11 Drawing Sheets

(56) References Cited

U.S. PATENT DOCUMENTS

| | | |
|---|---|---|
| 3,996,441 A | 12/1976 | Ohashi |
| 4,029,915 A | 6/1977 | Ojima |
| 4,103,252 A | 7/1978 | Bobick |
| 4,110,749 A | 8/1978 | Janko et al. |
| 4,115,670 A | 9/1978 | Chandler |
| 4,121,204 A | 10/1978 | Welch et al. |
| 4,129,747 A | 12/1978 | Pepper |
| 4,158,216 A | 6/1979 | Bigelow |
| 4,242,676 A | 12/1980 | Piguet et al. |
| 4,246,452 A | 1/1981 | Chandler |
| 4,264,903 A | 4/1981 | Bigelow |
| 4,266,144 A | 5/1981 | Bristol |
| 4,293,734 A | 10/1981 | Pepper, Jr. |
| D264,969 S | 6/1982 | McGoutry |
| 4,338,502 A | 7/1982 | Hashimoto et al. |
| 4,380,007 A | 4/1983 | Steinegger |
| 4,380,040 A | 4/1983 | Posset |
| 4,394,649 A | 7/1983 | Suchoff et al. |
| 4,475,008 A | 10/1984 | Doi et al. |
| 4,570,149 A | 2/1986 | Thornburg et al. |
| 4,583,161 A | 4/1986 | Gunderson et al. |
| 4,587,378 A | 5/1986 | Moore |
| 4,604,786 A | 8/1986 | Howie, Jr. |
| 4,613,736 A | 9/1986 | Shichijo et al. |
| 4,644,100 A | 2/1987 | Brenner et al. |
| 4,719,524 A | 1/1988 | Morishima et al. |
| 4,734,034 A | 3/1988 | Maness et al. |
| 4,736,191 A | 4/1988 | Matzke et al. |
| 4,739,191 A | 4/1988 | Puar |
| 4,739,299 A | 4/1988 | Eventoff et al. |
| 4,752,655 A | 6/1988 | Tajiri et al. |
| 4,755,765 A | 7/1988 | Ferland |
| 4,764,717 A | 8/1988 | Tucker et al. |
| 4,771,139 A | 9/1988 | DeSmet |
| 4,798,919 A | 1/1989 | Miessler et al. |
| 4,810,992 A | 3/1989 | Eventoff |
| 4,822,957 A | 4/1989 | Talmage, Jr. et al. |
| 4,831,359 A | 5/1989 | Newell |
| 4,849,852 A | 7/1989 | Mullins |
| 4,856,993 A | 8/1989 | Maness et al. |
| 4,860,768 A | 8/1989 | Hon et al. |
| 4,866,602 A | 9/1989 | Hall |
| 4,876,524 A | 10/1989 | Jenkins |
| 4,897,511 A | 1/1990 | Itaya et al. |
| 4,914,624 A | 4/1990 | Dunthorn |
| 4,917,516 A | 4/1990 | Retter |
| 4,943,889 A | 7/1990 | Ohmatoi |
| 4,951,036 A | 8/1990 | Grueter et al. |
| 4,954,823 A | 9/1990 | Binstead |
| 4,976,435 A | 12/1990 | Shatford et al. |
| 4,990,900 A | 2/1991 | Kikuchi |
| 5,008,497 A | 4/1991 | Asher |
| 5,036,321 A | 7/1991 | Leach et al. |
| 5,053,757 A | 10/1991 | Meadows |
| 5,086,870 A | 2/1992 | Bolduc |
| 5,088,070 A | 2/1992 | Shiff |
| 5,107,082 A * | 4/1992 | Valenzona ............ H01H 23/025 200/292 |
| 5,125,077 A | 6/1992 | Hall |
| 5,159,159 A | 10/1992 | Asher |
| 5,179,648 A | 1/1993 | Hauck |
| 5,186,646 A | 2/1993 | Pederson |
| 5,192,082 A | 3/1993 | Inoue et al. |
| 5,193,669 A | 3/1993 | Demeo et al. |
| 5,231,326 A | 7/1993 | Echols |
| 5,237,311 A | 8/1993 | Malley et al. |
| 5,278,362 A | 1/1994 | Ohashi |
| 5,305,017 A | 4/1994 | Gerpheide |
| 5,313,027 A | 5/1994 | Inoue et al. |
| D349,280 S | 8/1994 | Kaneko |
| 5,339,213 A | 8/1994 | O'Callaghan |
| 5,367,199 A | 11/1994 | Lefkowitz et al. |
| 5,374,787 A | 12/1994 | Miller et al. |
| 5,379,057 A | 1/1995 | Clough et al. |
| 5,404,152 A | 4/1995 | Nagai |
| 5,408,621 A | 4/1995 | Ben-Arie |
| 5,414,445 A | 5/1995 | Kaneko et al. |
| 5,416,498 A | 5/1995 | Grant |
| 5,424,756 A | 6/1995 | Ho et al. |
| 5,432,531 A | 7/1995 | Calder et al. |
| 5,434,757 A | 7/1995 | Kashiwagi |
| 5,438,331 A | 8/1995 | Gilligan et al. |
| D362,431 S | 9/1995 | Kaneko et al. |
| 5,450,075 A | 9/1995 | Waddington |
| 5,453,761 A | 9/1995 | Tanaka |
| 5,473,343 A | 12/1995 | Kimmich et al. |
| 5,473,344 A | 12/1995 | Bacon et al. |
| 5,479,192 A | 12/1995 | Carroll, Jr. et al. |
| 5,481,278 A | 1/1996 | Shigematsu et al. |
| 5,483,261 A | 1/1996 | Yasutake |
| 5,483,454 A | 1/1996 | Lewiner et al. |
| 5,488,204 A | 1/1996 | Mead et al. |
| 5,494,157 A | 2/1996 | Golenz et al. |
| 5,495,077 A | 2/1996 | Miller et al. |
| 5,495,566 A | 2/1996 | Kwatinetz |
| 5,508,703 A | 4/1996 | Okamura et al. |
| 5,508,717 A | 4/1996 | Miller |
| 5,541,372 A | 7/1996 | Bailer et al. |
| 5,543,588 A | 8/1996 | Bisset et al. |
| 5,543,591 A | 8/1996 | Gillespie et al. |
| 5,555,004 A | 9/1996 | Ono et al. |
| 5,559,301 A | 9/1996 | Bryan, Jr. et al. |
| 5,559,943 A | 9/1996 | Cyr et al. |
| 5,561,445 A | 10/1996 | Miwa et al. |
| 5,563,632 A | 10/1996 | Roberts |
| 5,564,112 A | 10/1996 | Hayes et al. |
| 5,565,887 A | 10/1996 | McCambridge et al. |
| 5,578,817 A | 11/1996 | Bidiville et al. |
| 5,581,670 A | 12/1996 | Bier et al. |
| 5,585,823 A | 12/1996 | Duchon et al. |
| 5,589,856 A | 12/1996 | Stein et al. |
| 5,589,893 A | 12/1996 | Gaughan et al. |
| 5,591,945 A | 1/1997 | Kent |
| 5,596,347 A | 1/1997 | Robertson et al. |
| 5,596,697 A | 1/1997 | Foster et al. |
| 5,598,183 A | 1/1997 | Robertson et al. |
| 5,611,040 A | 3/1997 | Brewer et al. |
| 5,611,060 A | 3/1997 | Belfiore et al. |
| 5,613,137 A | 3/1997 | Bertram et al. |
| 5,617,114 A | 4/1997 | Bier et al. |
| 5,627,531 A | 5/1997 | Posso et al. |
| 5,632,679 A | 5/1997 | Tremmel |
| 5,640,258 A | 6/1997 | Kurashima et al. |
| 5,648,642 A | 7/1997 | Miller et al. |
| D382,550 S | 8/1997 | Kaneko et al. |
| 5,657,012 A | 8/1997 | Tait |
| 5,661,632 A | 8/1997 | Register |
| D385,542 S | 10/1997 | Kaneko et al. |
| 5,675,362 A | 10/1997 | Clough et al. |
| 5,689,285 A | 11/1997 | Asher |
| 5,721,849 A | 2/1998 | Amro |
| 5,726,687 A | 3/1998 | Belfiore et al. |
| 5,729,219 A | 3/1998 | Armstrong et al. |
| 5,730,165 A | 3/1998 | Philipp |
| 5,748,185 A | 5/1998 | Stephan et al. |
| 5,751,274 A | 5/1998 | Davis |
| 5,754,890 A | 5/1998 | Holmdahl et al. |
| 5,764,066 A | 6/1998 | Novak et al. |
| 5,764,218 A | 6/1998 | Della Bona et al. |
| 5,777,605 A | 7/1998 | Yoshinobu et al. |
| 5,786,818 A | 7/1998 | Brewer et al. |
| 5,790,769 A | 8/1998 | Buxton et al. |
| 5,798,752 A | 8/1998 | Buxton et al. |
| 5,801,941 A | 9/1998 | Betram et al. |
| 5,805,144 A | 9/1998 | Scholder et al. |
| 5,808,602 A | 9/1998 | Sellers |
| 5,812,239 A | 9/1998 | Eger |
| 5,812,498 A | 9/1998 | Teres |
| 5,815,141 A | 9/1998 | Phares |
| 5,821,922 A | 10/1998 | Sellers |
| 5,825,351 A | 10/1998 | Tam |
| 5,825,352 A | 10/1998 | Bisset et al. |
| 5,825,353 A | 10/1998 | Will |
| 5,828,364 A | 10/1998 | Siddiqui |

(56) References Cited

U.S. PATENT DOCUMENTS

| | | |
|---|---|---|
| 5,835,079 A | 11/1998 | Shieh |
| 5,838,304 A | 11/1998 | Hall |
| 5,841,078 A | 11/1998 | Miller et al. |
| 5,841,423 A | 11/1998 | Carroll, Jr. et al. |
| D402,281 S | 12/1998 | Ledbetter et al. |
| 5,850,213 A | 12/1998 | Imai et al. |
| 5,856,645 A | 1/1999 | Norton |
| 5,856,822 A | 1/1999 | Du et al. |
| 5,859,629 A | 1/1999 | Tognazzini |
| 5,861,875 A | 1/1999 | Gerpheide |
| 5,864,334 A | 1/1999 | Sellers |
| 5,867,914 A | 2/1999 | Watson et al. |
| 5,869,791 A | 2/1999 | Young |
| 5,875,311 A | 2/1999 | Bertram et al. |
| 5,880,411 A | 3/1999 | Gillespie et al. |
| 5,883,612 A | 3/1999 | Kreitzer |
| 5,883,619 A | 3/1999 | Ho et al. |
| 5,889,236 A | 3/1999 | Gillespie et al. |
| 5,889,511 A | 3/1999 | Ong et al. |
| 5,890,181 A | 3/1999 | Selesky et al. |
| 5,894,117 A | 4/1999 | Kamishima |
| 5,903,229 A | 5/1999 | Kishi |
| 5,907,152 A | 5/1999 | Dandiliker et al. |
| 5,907,318 A | 5/1999 | Medina |
| 5,909,211 A | 6/1999 | Combs et al. |
| 5,910,802 A | 6/1999 | Shields et al. |
| 5,914,706 A | 6/1999 | Kono |
| 5,923,388 A | 7/1999 | Kurashima et al. |
| D412,940 S | 8/1999 | Kato et al. |
| 5,933,102 A | 8/1999 | Miller et al. |
| 5,933,141 A | 8/1999 | Smith |
| 5,936,619 A | 8/1999 | Nagasaki et al. |
| 5,943,044 A | 8/1999 | Martinelli et al. |
| 5,953,000 A | 9/1999 | Weirich |
| 5,956,019 A | 9/1999 | Bang et al. |
| 5,959,610 A | 9/1999 | Silfvast |
| 5,959,611 A | 9/1999 | Smailagic et al. |
| 5,963,671 A | 10/1999 | Comerford et al. |
| 5,964,661 A | 10/1999 | Dodge |
| 5,973,668 A | 10/1999 | Watanabe |
| 6,000,000 A | 12/1999 | Hawkins et al. |
| 6,002,093 A | 12/1999 | Hrehor et al. |
| 6,002,389 A | 12/1999 | Kasser et al. |
| 6,005,299 A | 12/1999 | Hengst |
| 6,011,542 A | 1/2000 | Durrani et al. |
| 6,025,832 A | 2/2000 | Sudo et al. |
| 6,031,518 A | 2/2000 | Adams et al. |
| 6,034,672 A | 3/2000 | Gaultier et al. |
| 6,040,829 A | 3/2000 | Croy et al. |
| 6,057,829 A | 5/2000 | Silfvast |
| 6,075,533 A | 6/2000 | Chang |
| 6,084,574 A | 7/2000 | Bidiville |
| D430,169 S | 8/2000 | Scibora |
| 6,097,372 A | 8/2000 | Suzuki |
| 6,104,790 A | 8/2000 | Narayanaswami |
| 6,118,435 A | 9/2000 | Fujita et al. |
| 6,122,526 A | 9/2000 | Parulski et al. |
| 6,124,587 A | 9/2000 | Bidiville et al. |
| 6,128,006 A | 10/2000 | Rosenberg et al. |
| 6,131,048 A | 10/2000 | Sudo et al. |
| 6,141,068 A | 10/2000 | Lijima |
| 6,147,856 A | 11/2000 | Karidis |
| 6,163,312 A | 12/2000 | Furuya |
| 6,166,721 A | 12/2000 | Kuroiwa et al. |
| 6,179,496 B1 | 1/2001 | Chou |
| 6,181,322 B1 | 1/2001 | Nanavati |
| D437,860 S | 2/2001 | Suzuki et al. |
| 6,185,591 B1 | 2/2001 | Baker et al. |
| 6,188,391 B1 | 2/2001 | Seely et al. |
| 6,188,393 B1 | 2/2001 | Shu |
| 6,191,774 B1 | 2/2001 | Schena et al. |
| 6,198,054 B1 | 3/2001 | Janniere |
| 6,198,473 B1 | 3/2001 | Armstrong |
| 6,211,861 B1 | 4/2001 | Rosenberg et al. |
| 6,216,988 B1 | 4/2001 | Hsu et al. |
| 6,219,038 B1 | 4/2001 | Cho |
| 6,222,528 B1 | 4/2001 | Gerpheide et al. |
| D442,592 S | 5/2001 | Ledbetter et al. |
| 6,225,976 B1 | 5/2001 | Yates et al. |
| 6,225,980 B1 | 5/2001 | Weiss et al. |
| 6,226,534 B1 | 5/2001 | Aizawa |
| 6,227,966 B1 | 5/2001 | Yokoi |
| D443,616 S | 6/2001 | Fisher et al. |
| 6,243,078 B1 | 6/2001 | Rosenberg |
| 6,243,080 B1 | 6/2001 | Molne |
| 6,243,646 B1 | 6/2001 | Ozaki et al. |
| 6,246,395 B1 | 6/2001 | Goyins et al. |
| 6,248,017 B1 | 6/2001 | Roach |
| 6,254,477 B1 | 7/2001 | Sasaki et al. |
| 6,256,011 B1 | 7/2001 | Culver |
| 6,259,491 B1 | 7/2001 | Ekedahl et al. |
| 6,262,717 B1 | 7/2001 | Donohue et al. |
| 6,262,785 B1 | 7/2001 | Kim |
| 6,266,050 B1 | 7/2001 | Oh et al. |
| 6,285,211 B1 | 9/2001 | Sample et al. |
| D448,810 S | 10/2001 | Goto |
| 6,297,795 B1 | 10/2001 | Kato et al. |
| 6,297,811 B1 | 10/2001 | Kent et al. |
| 6,300,946 B1 | 10/2001 | Lincke et al. |
| 6,307,539 B2 | 10/2001 | Suzuki |
| 6,310,610 B1 | 10/2001 | Beaton et al. |
| D450,713 S | 11/2001 | Masamitsu et al. |
| 6,314,483 B1 | 11/2001 | Goto et al. |
| 6,321,441 B1 | 11/2001 | Davidson et al. |
| 6,323,845 B1 | 11/2001 | Robbins |
| 6,323,846 B1 | 11/2001 | Westerman et al. |
| D452,250 S | 12/2001 | Chan |
| 6,330,244 B1 | 12/2001 | Swartz et al. |
| 6,336,614 B1 | 1/2002 | Kwitek |
| 6,337,678 B1 | 1/2002 | Fish |
| 6,340,800 B1 | 1/2002 | Zhai et al. |
| 6,344,619 B1 * | 2/2002 | Yamasaki ............ H01H 25/041 200/6 A |
| D454,568 S | 3/2002 | Andre et al. |
| 6,357,887 B1 | 3/2002 | Novak |
| 6,359,572 B1 | 3/2002 | Vale |
| D455,793 S | 4/2002 | Lin |
| 6,373,265 B1 | 4/2002 | Morimoto et al. |
| 6,373,470 B1 | 4/2002 | Andre et al. |
| 6,377,530 B1 | 4/2002 | Burrows |
| 6,396,523 B1 | 5/2002 | Segal et al. |
| 6,407,325 B2 | 6/2002 | Yi et al. |
| 6,424,338 B1 | 7/2002 | Anderson |
| 6,429,846 B2 | 8/2002 | Rosenberg et al. |
| 6,429,852 B1 | 8/2002 | Adams et al. |
| 6,437,836 B1 | 8/2002 | Huang et al. |
| 6,452,514 B1 | 9/2002 | Philipp |
| 6,462,941 B1 | 10/2002 | Hulick et al. |
| 6,465,271 B1 | 10/2002 | Ko et al. |
| 6,473,069 B1 | 10/2002 | Gerphelde |
| 6,492,602 B2 | 12/2002 | Asai et al. |
| 6,492,979 B1 | 12/2002 | Kent et al. |
| 6,496,181 B1 | 12/2002 | Bomer et al. |
| 6,497,412 B1 | 12/2002 | Bramm |
| D468,365 S | 1/2003 | Bransky et al. |
| D469,109 S | 1/2003 | Andre et al. |
| D472,245 S | 3/2003 | Andre et al. |
| 6,546,231 B1 | 4/2003 | Someya et al. |
| 6,556,222 B1 | 4/2003 | Narayanaswami |
| 6,563,487 B2 | 5/2003 | Martin et al. |
| 6,573,844 B1 | 6/2003 | Venolia et al. |
| 6,587,091 B2 | 7/2003 | Serpa |
| 6,597,345 B2 | 7/2003 | Hirshberg |
| 6,600,481 B1 | 7/2003 | Brown et al. |
| 6,606,244 B1 | 8/2003 | Liu et al. |
| 6,610,936 B2 | 8/2003 | Gillespie et al. |
| 6,611,253 B1 | 8/2003 | Cohen |
| 6,618,909 B1 | 9/2003 | Yang |
| 6,636,197 B1 | 10/2003 | Goldenberg et al. |
| 6,639,584 B1 | 10/2003 | Li |
| 6,640,250 B1 | 10/2003 | Chang et al. |
| 6,650,975 B2 | 11/2003 | Ruffner |
| 6,654,001 B1 | 11/2003 | Su |
| D483,809 S | 12/2003 | Lim |

(56) References Cited

U.S. PATENT DOCUMENTS

| | | |
|---|---|---|
| 6,657,560 B1 | 12/2003 | Jung |
| 6,658,773 B2 | 12/2003 | Rohne et al. |
| 6,661,438 B1 | 12/2003 | Shiraishi et al. |
| 6,664,951 B1 | 12/2003 | Fujii et al. |
| 6,674,439 B1 | 1/2004 | Shin et al. |
| 6,677,927 B1 | 1/2004 | Bruck et al. |
| 6,678,215 B1 | 1/2004 | Treyz et al. |
| 6,678,891 B1 | 1/2004 | Wilcox et al. |
| 6,683,649 B1 | 1/2004 | Anderson |
| 6,684,110 B1 | 1/2004 | Kutsuna et al. |
| 6,686,904 B1 | 2/2004 | Sherman et al. |
| 6,686,906 B2 | 2/2004 | Salminen et al. |
| 6,690,387 B2 | 2/2004 | Zimmerman et al. |
| 6,703,550 B2 | 3/2004 | Chu |
| 6,710,771 B1 | 3/2004 | Yamaguchi et al. |
| 6,724,817 B1 | 4/2004 | Simpson et al. |
| 6,727,889 B2 | 4/2004 | Shaw |
| D489,731 S | 5/2004 | Huang |
| 6,738,045 B2 | 5/2004 | Hinckley et al. |
| 6,747,636 B2 | 6/2004 | Martin |
| 6,750,803 B2 | 6/2004 | Yates et al. |
| 6,756,971 B1 | 6/2004 | Ramey et al. |
| 6,760,012 B1 | 7/2004 | Laurila |
| 6,765,557 B1 | 7/2004 | Segal et al. |
| 6,781,576 B2 | 8/2004 | Tamura |
| 6,784,384 B2 | 8/2004 | Park et al. |
| 6,788,288 B2 | 9/2004 | Ano |
| 6,791,533 B2 | 9/2004 | Su |
| 6,795,057 B2 | 9/2004 | Gordon |
| D497,618 S | 10/2004 | Andre et al. |
| 6,810,271 B1 | 10/2004 | Wood et al. |
| 6,819,312 B2 | 11/2004 | Fish |
| 6,822,640 B2 | 11/2004 | Derocher |
| 6,834,975 B2 | 12/2004 | Chu-Chia et al. |
| 6,842,015 B2 | 1/2005 | Morimoto |
| 6,844,872 B1 | 1/2005 | Farag et al. |
| 6,855,899 B2 | 2/2005 | Sotome |
| 6,865,718 B2 | 3/2005 | Levi Montalcini |
| 6,867,965 B2 | 3/2005 | Khoo |
| 6,886,842 B2 | 5/2005 | Vey et al. |
| 6,894,916 B2 | 5/2005 | Reohr et al. |
| D506,476 S | 6/2005 | Andre et al. |
| 6,922,189 B2 | 7/2005 | Fujiyoshi |
| 6,930,494 B2 | 8/2005 | Tesdahl et al. |
| 6,933,732 B2 | 8/2005 | Morimoto |
| 6,943,705 B1 | 9/2005 | Bolender et al. |
| 6,943,779 B2 | 9/2005 | Satoh |
| 6,958,614 B2 | 10/2005 | Morimoto |
| 6,977,808 B2 | 12/2005 | Lam et al. |
| 6,978,127 B2 | 12/2005 | Bulthuis et al. |
| 6,982,695 B1 | 1/2006 | Canova et al. |
| 6,985,137 B2 | 1/2006 | Kaikuranta |
| 7,006,077 B1 | 2/2006 | Uusimäki |
| 7,015,894 B2 | 3/2006 | Morohoshi |
| 7,019,225 B2 | 3/2006 | Matsumoto et al. |
| 7,036,946 B1 | 5/2006 | Mosier |
| 7,038,659 B2 | 5/2006 | Rajkowski |
| 7,046,230 B2 | 5/2006 | Zadesky et al. |
| 7,050,292 B2 | 5/2006 | Shimura et al. |
| 7,069,044 B2 | 6/2006 | Okada et al. |
| 7,078,633 B2 | 7/2006 | Ihalainen |
| 7,084,856 B2 | 8/2006 | Huppi |
| 7,088,347 B2 | 8/2006 | Iisaka et al. |
| 7,107,147 B2 | 9/2006 | Pascual et al. |
| 7,111,788 B2 | 9/2006 | Reponen |
| 7,113,196 B2 | 9/2006 | Kerr |
| 7,117,136 B1 | 10/2006 | Rosedale |
| 7,119,792 B1 | 10/2006 | Andre et al. |
| 7,149,550 B2 | 12/2006 | Kraft et al. |
| 7,184,064 B2 | 2/2007 | Zimmerman et al. |
| 7,215,319 B2 | 5/2007 | Kamijo et al. |
| 7,218,956 B2 | 5/2007 | Okawa |
| 7,233,318 B1 | 6/2007 | Farag et al. |
| 7,236,154 B1 | 6/2007 | Kerr et al. |
| 7,236,159 B1 | 6/2007 | Siversson |
| 7,253,643 B1 | 8/2007 | Seguine |
| 7,279,647 B2 | 10/2007 | Philipp |
| 7,286,115 B2 | 10/2007 | Longe et al. |
| 7,288,732 B2 | 10/2007 | Hashida |
| 7,297,883 B2 | 11/2007 | Rochon et al. |
| 7,310,089 B2 | 12/2007 | Baker et al. |
| 7,312,785 B2 | 12/2007 | Tsuk et al. |
| 7,321,103 B2 | 1/2008 | Nakanishi et al. |
| 7,333,092 B2 | 2/2008 | Zadesky et al. |
| 7,345,670 B2 | 3/2008 | Armstrong |
| 7,348,898 B2 | 3/2008 | Ono |
| 7,382,139 B2 | 6/2008 | Mackey |
| 7,394,038 B2 | 7/2008 | Chang |
| 7,395,081 B2 | 7/2008 | Bonnelykke Kristensen |
| 7,397,467 B2 | 7/2008 | Park et al. |
| 7,439,963 B2 | 10/2008 | Geaghan et al. |
| 7,466,307 B2 | 12/2008 | Trent et al. |
| 7,479,949 B2 | 1/2009 | Jobs et al. |
| 7,486,323 B2 | 2/2009 | Lee et al. |
| 7,499,040 B2 | 3/2009 | Zadesky et al. |
| 7,502,016 B2 | 3/2009 | Trent, Jr. et al. |
| 7,503,193 B2 | 3/2009 | Schoene et al. |
| 7,593,782 B2 | 9/2009 | Jobs et al. |
| 7,616,097 B1 | 11/2009 | Whang |
| 7,633,076 B2 | 12/2009 | Huppi et al. |
| 7,645,955 B2 | 1/2010 | Huang et al. |
| 7,663,607 B2 | 2/2010 | Hotelling et al. |
| 7,671,837 B2 | 3/2010 | Forsblad et al. |
| 7,708,051 B2 | 5/2010 | Katsumi et al. |
| 7,746,323 B1 | 6/2010 | Otsuki et al. |
| 7,764,272 B1 | 7/2010 | Clifton-Bligh |
| 7,772,507 B2 | 8/2010 | Orr et al. |
| 7,852,199 B2 | 12/2010 | Desai et al. |
| 7,932,893 B1 | 4/2011 | Berthaud |
| 8,001,488 B1 | 8/2011 | Lam |
| 8,022,935 B2 | 9/2011 | Hotelling |
| 8,044,314 B2 | 10/2011 | Webe et al. |
| 8,072,439 B2 | 12/2011 | Hillis et al. |
| 8,125,453 B2 | 2/2012 | Shaholan et al. |
| 8,174,508 B2 | 5/2012 | Sinclair et al. |
| 8,471,811 B2 | 6/2013 | Harley |
| 8,479,122 B2 | 7/2013 | Hotelling et al. |
| 8,645,827 B2 | 2/2014 | Beaver et al. |
| 8,749,493 B2 | 6/2014 | Zadesky et al. |
| 9,367,151 B2 | 6/2016 | McKillop |
| 2001/0006388 A1 | 7/2001 | Kim et al. |
| 2001/0011991 A1 | 8/2001 | Wang et al. |
| 2001/0011993 A1 | 8/2001 | Saarinen |
| 2001/0033270 A1 | 10/2001 | Osawa et al. |
| 2001/0035854 A1 | 11/2001 | Rosenberg et al. |
| 2001/0043545 A1 | 11/2001 | Aratani |
| 2001/0047926 A1* | 12/2001 | Kozuma ............ H01H 25/008 200/6 A |
| 2001/0050673 A1 | 12/2001 | Davenport |
| 2001/0051046 A1 | 12/2001 | Watanabe et al. |
| 2001/0053692 A1 | 12/2001 | Ito et al. |
| 2002/0000978 A1 | 1/2002 | Gerpheide |
| 2002/0002039 A1 | 1/2002 | Qureshey et al. |
| 2002/0002643 A1 | 1/2002 | Yamamoto et al. |
| 2002/0009193 A1 | 1/2002 | Deguchi |
| 2002/0011993 A1 | 1/2002 | Lui et al. |
| 2002/0027547 A1 | 3/2002 | Kamijo |
| 2002/0030665 A1 | 3/2002 | Ano |
| 2002/0033848 A1 | 3/2002 | Sciammarella et al. |
| 2002/0039493 A1 | 4/2002 | Tanaka |
| 2002/0045960 A1 | 4/2002 | Phillips et al. |
| 2002/0071550 A1 | 6/2002 | Pletikosa |
| 2002/0072394 A1 | 6/2002 | Muramatsu |
| 2002/0080123 A1 | 6/2002 | Kennedy et al. |
| 2002/0084721 A1 | 7/2002 | Walczak |
| 2002/0089545 A1 | 7/2002 | Levi Montalcini |
| 2002/0103796 A1 | 8/2002 | Hartley |
| 2002/0118131 A1 | 8/2002 | Yates et al. |
| 2002/0118169 A1 | 8/2002 | Hinckley et al. |
| 2002/0140668 A1 | 10/2002 | Crawford |
| 2002/0145594 A1 | 10/2002 | Derocher |
| 2002/0154090 A1 | 10/2002 | Lin |
| 2002/0158838 A1 | 10/2002 | Smith et al. |
| 2002/0158844 A1 | 10/2002 | McLoone et al. |

(56) References Cited

U.S. PATENT DOCUMENTS

| | | |
|---|---|---|
| 2002/0164156 A1 | 11/2002 | Bilbrey |
| 2002/0168947 A1 | 11/2002 | Lemley |
| 2002/0180701 A1 | 12/2002 | Hayama et al. |
| 2002/0196234 A1 | 12/2002 | Gray |
| 2002/0196239 A1 | 12/2002 | Lee |
| 2003/0002246 A1 | 1/2003 | Kerr |
| 2003/0025679 A1 | 2/2003 | Taylor et al. |
| 2003/0028346 A1 | 2/2003 | Sinclair et al. |
| 2003/0030628 A1 | 2/2003 | Sato et al. |
| 2003/0038776 A1 | 2/2003 | Rosenberg et al. |
| 2003/0038824 A1 | 2/2003 | Ryder |
| 2003/0043121 A1 | 3/2003 | Chen |
| 2003/0043174 A1 | 3/2003 | Hinckley et al. |
| 2003/0048262 A1 | 3/2003 | Wu et al. |
| 2003/0050092 A1 | 3/2003 | Yun |
| 2003/0070106 A1 | 4/2003 | Kosuda et al. |
| 2003/0076301 A1 | 4/2003 | Tsuk et al. |
| 2003/0076303 A1 | 4/2003 | Huppi |
| 2003/0076306 A1* | 4/2003 | Zadesky .............. G06F 1/1626 345/173 |
| 2003/0080947 A1 | 5/2003 | Genest et al. |
| 2003/0091377 A1 | 5/2003 | Hsu et al. |
| 2003/0095095 A1 | 5/2003 | Pihlaja |
| 2003/0095096 A1 | 5/2003 | Robbin et al. |
| 2003/0098851 A1 | 5/2003 | Brink |
| 2003/0103043 A1 | 6/2003 | Mulligan et al. |
| 2003/0104839 A1 | 6/2003 | Kraft et al. |
| 2003/0122779 A1 | 7/2003 | Martin et al. |
| 2003/0122792 A1 | 7/2003 | Yamamoto et al. |
| 2003/0135292 A1 | 7/2003 | Husgafvel et al. |
| 2003/0142081 A1 | 7/2003 | Lizuka et al. |
| 2003/0142288 A1 | 7/2003 | Kinrot et al. |
| 2003/0162569 A1 | 8/2003 | Arakawa et al. |
| 2003/0184517 A1 | 10/2003 | Senzui et al. |
| 2003/0197740 A1 | 10/2003 | Reponen |
| 2003/0202336 A1 | 10/2003 | Ostergard et al. |
| 2003/0206162 A1 | 11/2003 | Roberts |
| 2003/0206202 A1 | 11/2003 | Moriya |
| 2003/0210537 A1 | 11/2003 | Engelmann |
| 2003/0224831 A1 | 12/2003 | Engstrom et al. |
| 2004/0009788 A1 | 1/2004 | Mantyjarvi et al. |
| 2004/0021643 A1 | 2/2004 | Hoshino et al. |
| 2004/0027341 A1 | 2/2004 | Derocher |
| 2004/0032393 A1 | 2/2004 | Brandenberg et al. |
| 2004/0055446 A1 | 3/2004 | Robbin et al. |
| 2004/0055860 A1* | 3/2004 | Huseman ............ H01H 13/7006 200/406 |
| 2004/0061677 A1 | 4/2004 | Hejza Litwiller |
| 2004/0062033 A1 | 4/2004 | Chu-Chia et al. |
| 2004/0066405 A1 | 4/2004 | Wessler et al. |
| 2004/0070567 A1 | 4/2004 | Longe et al. |
| 2004/0074756 A1 | 4/2004 | Kawakami et al. |
| 2004/0075676 A1 | 4/2004 | Rosenberg et al. |
| 2004/0080682 A1 | 4/2004 | Dalton |
| 2004/0104894 A1 | 6/2004 | Tsukada et al. |
| 2004/0109357 A1 | 6/2004 | Cernea et al. |
| 2004/0150619 A1 | 8/2004 | Baudisch et al. |
| 2004/0155865 A1 | 8/2004 | Swiader |
| 2004/0156192 A1 | 8/2004 | Kerr et al. |
| 2004/0165924 A1 | 8/2004 | Griffin |
| 2004/0178997 A1 | 9/2004 | Gillespie et al. |
| 2004/0185912 A1 | 9/2004 | Mason et al. |
| 2004/0196268 A1 | 10/2004 | Hsu et al. |
| 2004/0200699 A1 | 10/2004 | Matsumoto et al. |
| 2004/0215986 A1 | 10/2004 | Shakkarwar |
| 2004/0218963 A1 | 11/2004 | Van Diepen et al. |
| 2004/0224638 A1 | 11/2004 | Fadeii et al. |
| 2004/0227736 A1 | 11/2004 | Kamrath et al. |
| 2004/0233624 A1 | 11/2004 | Aisenberg |
| 2004/0239622 A1 | 12/2004 | Proctor et al. |
| 2004/0252109 A1 | 12/2004 | Trent, Jr. et al. |
| 2004/0252867 A1 | 12/2004 | Lan et al. |
| 2004/0253989 A1 | 12/2004 | Tupler et al. |
| 2004/0263388 A1 | 12/2004 | Krumm et al. |
| 2004/0267874 A1 | 12/2004 | Westberg et al. |
| 2005/0012644 A1 | 1/2005 | Hurst et al. |
| 2005/0017957 A1 | 1/2005 | Yi |
| 2005/0024341 A1 | 2/2005 | Gillespie et al. |
| 2005/0030048 A1 | 2/2005 | Bolender |
| 2005/0042012 A1 | 2/2005 | Ward et al. |
| 2005/0052416 A1 | 3/2005 | Backman et al. |
| 2005/0052425 A1* | 3/2005 | Zadesky .............. G06F 3/0338 345/173 |
| 2005/0052426 A1 | 3/2005 | Hagermoser et al. |
| 2005/0052427 A1 | 3/2005 | Wu et al. |
| 2005/0052429 A1 | 3/2005 | Philipp |
| 2005/0068304 A1 | 3/2005 | Lewis et al. |
| 2005/0078093 A1 | 4/2005 | Peterson et al. |
| 2005/0081164 A1 | 4/2005 | Hama et al. |
| 2005/0083299 A1 | 4/2005 | Nagasaka |
| 2005/0083307 A1 | 4/2005 | Aufderheide |
| 2005/0090288 A1 | 4/2005 | Stohr et al. |
| 2005/0104867 A1 | 5/2005 | Westerman et al. |
| 2005/0110768 A1 | 5/2005 | Marriott et al. |
| 2005/0125570 A1 | 6/2005 | Olodort et al. |
| 2005/0129199 A1 | 6/2005 | Abe |
| 2005/0139460 A1 | 6/2005 | Hosaka |
| 2005/0140657 A1 | 6/2005 | Park et al. |
| 2005/0143124 A1 | 6/2005 | Kennedy et al. |
| 2005/0146512 A1 | 7/2005 | Hill et al. |
| 2005/0156881 A1 | 7/2005 | Trent et al. |
| 2005/0156890 A1* | 7/2005 | Wierzoch ............ G06F 3/03543 345/163 |
| 2005/0162402 A1 | 7/2005 | Watanachote |
| 2005/0195159 A1 | 9/2005 | Hunleth et al. |
| 2005/0204309 A1 | 9/2005 | Szeto |
| 2005/0237308 A1 | 10/2005 | Autio et al. |
| 2005/0253818 A1 | 11/2005 | Nettamo |
| 2005/0283724 A1 | 12/2005 | Griffin |
| 2006/0007131 A1 | 1/2006 | Lane et al. |
| 2006/0026521 A1 | 2/2006 | Hotelling et al. |
| 2006/0032680 A1 | 2/2006 | Elias et al. |
| 2006/0033701 A1 | 2/2006 | Wilson |
| 2006/0038791 A1 | 2/2006 | Mackey |
| 2006/0052885 A1 | 3/2006 | Kong |
| 2006/0060455 A1* | 3/2006 | Mimata .............. G05G 9/04796 200/48 A |
| 2006/0095848 A1 | 5/2006 | Naik |
| 2006/0097991 A1 | 5/2006 | Hotelling et al. |
| 2006/0097997 A1 | 5/2006 | Borgaonkar et al. |
| 2006/0131156 A1 | 6/2006 | Voelckers |
| 2006/0143574 A1 | 6/2006 | Ito et al. |
| 2006/0174568 A1 | 8/2006 | Kinoshita et al. |
| 2006/0181515 A1 | 8/2006 | Fletcher et al. |
| 2006/0181517 A1 | 8/2006 | Zadesky et al. |
| 2006/0197750 A1 | 9/2006 | Kerr et al. |
| 2006/0197753 A1 | 9/2006 | Hotelling |
| 2006/0232557 A1 | 10/2006 | Fallot-Burghardt |
| 2006/0236262 A1 | 10/2006 | Bathiche et al. |
| 2006/0250377 A1* | 11/2006 | Zadesky .............. G06F 1/1613 345/173 |
| 2006/0274042 A1 | 12/2006 | Krah et al. |
| 2006/0274905 A1 | 12/2006 | Lindahl et al. |
| 2006/0279896 A1 | 12/2006 | Bruwer |
| 2006/0284836 A1 | 12/2006 | Philipp |
| 2007/0013671 A1 | 1/2007 | Zadesky et al. |
| 2007/0018970 A1 | 1/2007 | Tabasso et al. |
| 2007/0046641 A1 | 3/2007 | Lim |
| 2007/0052044 A1 | 3/2007 | Forsblad et al. |
| 2007/0052691 A1 | 3/2007 | Zadesky et al. |
| 2007/0075965 A1 | 4/2007 | Huppi et al. |
| 2007/0080936 A1 | 4/2007 | Tsuk et al. |
| 2007/0080938 A1 | 4/2007 | Robbin et al. |
| 2007/0080952 A1 | 4/2007 | Lynch et al. |
| 2007/0083822 A1 | 4/2007 | Robbin et al. |
| 2007/0085841 A1 | 4/2007 | Tsuk et al. |
| 2007/0097086 A1 | 5/2007 | Battles et al. |
| 2007/0097089 A1* | 5/2007 | Battles ................ G06F 3/03547 345/173 |
| 2007/0106732 A1 | 5/2007 | Weis |
| 2007/0120834 A1 | 5/2007 | Boillot |
| 2007/0126696 A1 | 6/2007 | Boillot |
| 2007/0152975 A1 | 7/2007 | Ogihara et al. |
| 2007/0152977 A1 | 7/2007 | Ng et al. |

(56) References Cited

U.S. PATENT DOCUMENTS

| | | |
|---|---|---|
| 2007/0152983 A1 | 7/2007 | McKillop et al. |
| 2007/0155434 A1 | 7/2007 | Jobs et al. |
| 2007/0156364 A1* | 7/2007 | Rothkopf ............. G06F 1/1626 702/117 |
| 2007/0157089 A1 | 7/2007 | Van Os et al. |
| 2007/0182722 A1 | 8/2007 | Hotelling et al. |
| 2007/0242057 A1 | 10/2007 | Zadesky et al. |
| 2007/0247421 A1 | 10/2007 | Orsley et al. |
| 2007/0247429 A1 | 10/2007 | Westerman |
| 2007/0247443 A1 | 10/2007 | Philipp |
| 2007/0262968 A1 | 11/2007 | Kazuhito et al. |
| 2007/0268275 A1 | 11/2007 | Westerman et al. |
| 2007/0271516 A1 | 11/2007 | Carmichael |
| 2007/0273671 A1 | 11/2007 | Zadesky et al. |
| 2007/0276525 A1 | 11/2007 | Zadesky et al. |
| 2007/0279394 A1 | 12/2007 | Lampell |
| 2007/0285404 A1 | 12/2007 | Rimon et al. |
| 2007/0290990 A1 | 12/2007 | Robbin et al. |
| 2007/0291016 A1 | 12/2007 | Philipp |
| 2007/0296702 A1 | 12/2007 | Strawn et al. |
| 2007/0296709 A1 | 12/2007 | GuangHai |
| 2007/0298231 A1* | 12/2007 | Ito .......................... B32B 27/00 428/213 |
| 2008/0006453 A1 | 1/2008 | Hotelling et al. |
| 2008/0006454 A1 | 1/2008 | Hotelling |
| 2008/0007533 A1 | 1/2008 | Hotelling et al. |
| 2008/0007539 A1 | 1/2008 | Hotelling et al. |
| 2008/0012837 A1 | 1/2008 | Marriott et al. |
| 2008/0018615 A1 | 1/2008 | Zadesky et al. |
| 2008/0018616 A1 | 1/2008 | Lampell et al. |
| 2008/0018617 A1 | 1/2008 | Ng et al. |
| 2008/0036473 A1 | 2/2008 | Jansson |
| 2008/0036734 A1 | 2/2008 | Forsblad et al. |
| 2008/0060925 A1 | 3/2008 | Weber et al. |
| 2008/0069412 A1 | 3/2008 | Champagne et al. |
| 2008/0079699 A1 | 4/2008 | Mackey |
| 2008/0087476 A1 | 4/2008 | Prest |
| 2008/0088582 A1 | 4/2008 | Prest |
| 2008/0088596 A1 | 4/2008 | Prest |
| 2008/0088597 A1 | 4/2008 | Prest |
| 2008/0088600 A1 | 4/2008 | Prest |
| 2008/0094352 A1 | 4/2008 | Tsuk et al. |
| 2008/0098330 A1 | 4/2008 | Tsuk et al. |
| 2008/0110739 A1 | 5/2008 | Peng et al. |
| 2008/0111795 A1 | 5/2008 | Bollinger |
| 2008/0136792 A1 | 6/2008 | Peng et al. |
| 2008/0143681 A1 | 6/2008 | XiaoPing |
| 2008/0158145 A1 | 7/2008 | Westerman |
| 2008/0165158 A1 | 7/2008 | Hotelling et al. |
| 2008/0196945 A1 | 8/2008 | Konstas |
| 2008/0202824 A1 | 8/2008 | Philipp et al. |
| 2008/0209442 A1 | 8/2008 | Setlur et al. |
| 2008/0215841 A1* | 9/2008 | Bolotin ................. G06F 1/1632 711/164 |
| 2008/0264767 A1 | 10/2008 | Chen et al. |
| 2008/0280651 A1 | 11/2008 | Duarte |
| 2008/0284742 A1 | 11/2008 | Prest |
| 2008/0293274 A1 | 11/2008 | Milan |
| 2009/0021267 A1 | 1/2009 | Golovchenko et al. |
| 2009/0026558 A1 | 1/2009 | Bauer et al. |
| 2009/0033635 A1 | 2/2009 | Wai |
| 2009/0036176 A1 | 2/2009 | Ure |
| 2009/0058687 A1 | 3/2009 | Rothkopf et al. |
| 2009/0058801 A1 | 3/2009 | Bull |
| 2009/0058802 A1 | 3/2009 | Orsley et al. |
| 2009/0073130 A1 | 3/2009 | Weber et al. |
| 2009/0078551 A1 | 3/2009 | Kang |
| 2009/0101417 A1 | 4/2009 | Suzuki et al. |
| 2009/0109181 A1 | 4/2009 | Hui et al. |
| 2009/0141046 A1 | 6/2009 | Rathnam et al. |
| 2009/0160771 A1 | 6/2009 | Hinckley et al. |
| 2009/0179854 A1 | 7/2009 | Weber et al. |
| 2009/0197059 A1 | 8/2009 | Weber et al. |
| 2009/0229892 A1 | 9/2009 | Fisher et al. |
| 2009/0273573 A1 | 11/2009 | Hotelling |
| 2010/0058251 A1 | 3/2010 | Rottler et al. |
| 2010/0060568 A1 | 3/2010 | Fisher et al. |
| 2010/0073319 A1 | 3/2010 | Lyon et al. |
| 2010/0099394 A1 | 4/2010 | Hainzl |
| 2010/0149127 A1 | 6/2010 | Fisher et al. |
| 2010/0289759 A1 | 11/2010 | Fisher et al. |
| 2010/0313409 A1 | 12/2010 | Weber et al. |
| 2011/0005845 A1 | 1/2011 | Hotelling et al. |
| 2011/0163996 A1 | 7/2011 | Wassvik et al. |
| 2011/0199624 A1* | 8/2011 | Iwaki .................. H04N 1/00392 358/1.9 |
| 2011/0285662 A1* | 11/2011 | Maenpaa ............... G06F 3/0338 345/174 |
| 2012/0075242 A1 | 3/2012 | Hotelling |
| 2012/0106728 A1* | 5/2012 | Ghaffari ............ H04M 3/42272 379/211.02 |
| 2014/0306911 A1 | 10/2014 | Zadesky et al. |
| 2015/0049059 A1 | 2/2015 | Zadesky et al. |
| 2015/0062050 A1 | 3/2015 | Zadesky et al. |
| 2015/0212608 A1 | 7/2015 | McKillop et al. |
| 2016/0004278 A1 | 1/2016 | Hotelling |
| 2016/0004355 A1 | 1/2016 | Zadesky et al. |
| 2016/0154504 A1 | 6/2016 | Zadesky et al. |
| 2017/0010748 A1 | 1/2017 | Zadesky et al. |
| 2017/0010749 A1 | 1/2017 | Zadesky et al. |

FOREIGN PATENT DOCUMENTS

| | | |
|---|---|---|
| CN | 1139235 | 1/1997 |
| CN | 1330303 | 1/2002 |
| CN | 1455615 | 11/2003 |
| CN | 1499356 | 5/2004 |
| CN | 1659506 | 8/2005 |
| DE | 3615742 | 11/1987 |
| DE | 9316194 U1 | 2/1995 |
| DE | 19722636 | 12/1998 |
| DE | 10022537 | 11/2000 |
| DE | 20019074 | 2/2001 |
| DE | 103 04 704 A1 | 8/2004 |
| DE | 103 08 514 A1 | 9/2004 |
| DE | 10 2004 043 663 | 4/2006 |
| EP | 0178157 | 4/1986 |
| EP | 0419145 | 3/1991 |
| EP | 0 498 540 | 8/1992 |
| EP | 0 521 683 | 1/1993 |
| EP | 0 588 210 A1 | 3/1994 |
| EP | 0 674 288 | 9/1995 |
| EP | 0 731 407 | 9/1996 |
| EP | 0 551 778 | 1/1997 |
| EP | 0 880 091 | 11/1998 |
| EP | 1 018 680 A2 | 7/2000 |
| EP | 1 026 713 | 8/2000 |
| EP | 1 081 922 | 3/2001 |
| EP | 1 098 241 | 5/2001 |
| EP | 1 133 057 | 9/2001 |
| EP | 1 162 826 | 12/2001 |
| EP | 1 168 396 | 1/2002 |
| EP | 1 184 804 A2 | 3/2002 |
| EP | 1 197 835 A2 | 4/2002 |
| EP | 1 205 836 | 5/2002 |
| EP | 1 244 053 | 9/2002 |
| EP | 1 251 455 | 10/2002 |
| EP | 1 263 193 | 12/2002 |
| EP | 1 347 481 | 9/2003 |
| EP | 1 376 326 | 1/2004 |
| EP | 1 467 392 | 10/2004 |
| EP | 1 482 401 | 12/2004 |
| EP | 1 496 467 | 1/2005 |
| EP | 1 510 911 A2 | 3/2005 |
| EP | 1 513 049 A2 | 3/2005 |
| EP | 1 517 228 | 3/2005 |
| EP | 1 542 437 | 6/2005 |
| EP | 1 589 407 | 10/2005 |
| EP | 1 784 058 | 5/2007 |
| EP | 1 841 188 | 10/2007 |
| EP | 1 850 218 | 10/2007 |
| EP | 1 876 711 | 1/2008 |
| FR | 2 686 440 | 7/1993 |
| GB | 2015167 | 9/1979 |

(56) References Cited

FOREIGN PATENT DOCUMENTS

| | | |
|---|---|---|
| GB | 2072389 | 9/1981 |
| GB | 2315186 | 1/1998 |
| GB | 2333215 | 7/1999 |
| GB | 2 344 894 A | 6/2000 |
| GB | 2391060 | 1/2004 |
| GB | 2402105 | 12/2004 |
| JP | 57-95722 | 6/1982 |
| JP | 57-97626 | 6/1982 |
| JP | 61-075981 A | 4/1986 |
| JP | 61-117619 | 6/1986 |
| JP | 61-124009 | 6/1986 |
| JP | 63-20411 | 1/1988 |
| JP | 63-106826 | 5/1988 |
| JP | 63-181022 | 7/1988 |
| JP | 63-298518 | 12/1988 |
| JP | 2-307114 A | 12/1990 |
| JP | 03-57617 | 6/1991 |
| JP | 3-192418 | 8/1991 |
| JP | 03-237520 A | 10/1991 |
| JP | 4-32920 | 2/1992 |
| JP | 4-205408 | 7/1992 |
| JP | 5-041135 | 2/1993 |
| JP | 5-080938 | 4/1993 |
| JP | 5-101741 | 4/1993 |
| JP | 5-36623 | 5/1993 |
| JP | 5-189110 | 7/1993 |
| JP | 5-205565 | 8/1993 |
| JP | 5-211021 | 8/1993 |
| JP | 5-217464 | 8/1993 |
| JP | 5-233141 | 9/1993 |
| JP | 5-262276 | 10/1993 |
| JP | 5-265656 | 10/1993 |
| JP | 5-274956 | 10/1993 |
| JP | 5-289811 | 11/1993 |
| JP | 5-298955 | 11/1993 |
| JP | 5-325723 | 12/1993 |
| JP | 6-20570 | 1/1994 |
| JP | 6-084428 | 3/1994 |
| JP | 6-089636 | 3/1994 |
| JP | 6-96639 | 4/1994 |
| JP | 6-111695 | 4/1994 |
| JP | 6-139879 | 5/1994 |
| JP | 6-187078 | 7/1994 |
| JP | 6-208433 | 7/1994 |
| JP | 6-267382 | 9/1994 |
| JP | 6-283993 | 10/1994 |
| JP | 06-289969 A | 10/1994 |
| JP | 6-333459 | 12/1994 |
| JP | 07-073278 A | 3/1995 |
| JP | 7-107574 | 4/1995 |
| JP | 7-41882 | 7/1995 |
| JP | 7-201249 | 8/1995 |
| JP | 7-201256 | 8/1995 |
| JP | 7-253838 | 10/1995 |
| JP | 7-261899 | 10/1995 |
| JP | 7-261922 | 10/1995 |
| JP | 7-296670 | 11/1995 |
| JP | 7-319001 | 12/1995 |
| JP | 8-016292 | 1/1996 |
| JP | 8-115158 | 5/1996 |
| JP | 8-203387 | 8/1996 |
| JP | 8-293226 | 11/1996 |
| JP | 8-298045 | 11/1996 |
| JP | 8-299541 | 11/1996 |
| JP | 8-316664 | 11/1996 |
| JP | 9-044289 | 2/1997 |
| JP | 9-62448 | 3/1997 |
| JP | 9-069023 | 3/1997 |
| JP | 9-128148 | 5/1997 |
| JP | 9-134248 | 5/1997 |
| JP | 9-218747 | 8/1997 |
| JP | 9-230993 | 9/1997 |
| JP | 9-231858 | 9/1997 |
| JP | 9-233161 | 9/1997 |
| JP | 9-251347 | 9/1997 |
| JP | 9-258895 | 10/1997 |
| JP | 9-282987 | 10/1997 |
| JP | 9-288926 | 11/1997 |
| JP | 9-512979 | 12/1997 |
| JP | 10-003349 A | 1/1998 |
| JP | 10-63467 | 3/1998 |
| JP | 10-74127 | 3/1998 |
| JP | 10-074429 | 3/1998 |
| JP | 10-198507 | 7/1998 |
| JP | 10-227878 | 8/1998 |
| JP | 10-240693 | 9/1998 |
| JP | 10-289061 A | 10/1998 |
| JP | 10-293644 A | 11/1998 |
| JP | 10-320322 | 12/1998 |
| JP | 10-326149 | 12/1998 |
| JP | 11-24834 | 1/1999 |
| JP | 11-184607 | 7/1999 |
| JP | 11-194863 | 7/1999 |
| JP | 11-194872 | 7/1999 |
| JP | 11-194882 | 7/1999 |
| JP | 11-194883 | 7/1999 |
| JP | 11-194891 | 7/1999 |
| JP | 11-195353 | 7/1999 |
| JP | 11-203045 | 7/1999 |
| JP | 11-212725 | 8/1999 |
| JP | 11-272378 | 10/1999 |
| JP | 11-327788 A | 11/1999 |
| JP | 11-338628 | 12/1999 |
| JP | 2000-039964 A | 2/2000 |
| JP | 2000-163031 A | 6/2000 |
| JP | 2000-172441 A | 6/2000 |
| JP | 2000-194507 A | 7/2000 |
| JP | 2000-200147 | 7/2000 |
| JP | 2000-215549 | 8/2000 |
| JP | 2000-267777 | 9/2000 |
| JP | 2000-267786 | 9/2000 |
| JP | 2000-267797 | 9/2000 |
| JP | 2000-353045 | 12/2000 |
| JP | 2001-11769 | 1/2001 |
| JP | 2001-22508 | 1/2001 |
| JP | 2001-051790 A | 2/2001 |
| JP | 2001-184158 | 7/2001 |
| JP | 2001-265519 A | 9/2001 |
| JP | 2002-056747 A | 2/2002 |
| JP | 3085481 | 2/2002 |
| JP | 2002-210863 A | 7/2002 |
| JP | 2002-215311 | 8/2002 |
| JP | 2002-287889 A | 10/2002 |
| JP | 2002-287903 A | 10/2002 |
| JP | 2002-342033 A | 11/2002 |
| JP | 2003-015796 | 1/2003 |
| JP | 2003-029919 A | 1/2003 |
| JP | 2003-060754 | 2/2003 |
| JP | 2003-099198 | 4/2003 |
| JP | 2003-150303 | 5/2003 |
| JP | 2003-517674 | 5/2003 |
| JP | 2003-173237 A | 6/2003 |
| JP | 2003-280799 | 10/2003 |
| JP | 2003-280807 | 10/2003 |
| JP | 2004-170941 A | 6/2004 |
| JP | 2004-184396 A | 7/2004 |
| JP | 2004-362097 | 12/2004 |
| JP | 2005-082086 A | 3/2005 |
| JP | 2005-251218 | 9/2005 |
| JP | 2005-251218 A | 9/2005 |
| JP | 2005-285140 | 10/2005 |
| JP | 2005-285140 A | 10/2005 |
| JP | 2005-293606 | 10/2005 |
| JP | 2005-293606 A | 10/2005 |
| JP | 2006-004453 | 1/2006 |
| JP | 2006-4453 A | 1/2006 |
| JP | 2006-512626 A | 4/2006 |
| JP | 2006-178962 | 7/2006 |
| JP | 2006-178962 A | 7/2006 |
| JP | 3852854 | 12/2006 |
| JP | 2007-123473 | 5/2007 |
| JP | 2007-123473 A | 5/2007 |
| JP | 2007-242035 A | 9/2007 |
| JP | 2008-140182 A | 6/2008 |

(56) References Cited

FOREIGN PATENT DOCUMENTS

| | | |
|---|---|---|
| KR | 1998-71394 | 10/1998 |
| KR | 1999-50198 | 7/1999 |
| KR | 2000-0008579 | 2/2000 |
| KR | 2001-0052016 | 6/2001 |
| KR | 2001-108361 | 12/2001 |
| KR | 2002-65059 | 8/2002 |
| KR | 2004-0103125 A | 12/2004 |
| KR | 10-2005-0006068 A | 1/2005 |
| KR | 10-2006-0021678 | 3/2006 |
| TW | 431607 | 4/2001 |
| TW | 434606 B | 5/2001 |
| TW | 00470193 | 12/2001 |
| TW | 547716 | 8/2003 |
| TW | I220491 | 8/2004 |
| TW | 200421192 | 10/2004 |
| TW | I226584 | 1/2005 |
| TW | 200511091 | 3/2005 |
| TW | I200622841 | 7/2006 |
| WO | WO-92/11623 A1 | 7/1992 |
| WO | WO-94/17494 | 8/1994 |
| WO | WO-95/00897 | 1/1995 |
| WO | WO-1996/27968 | 9/1996 |
| WO | WO-98/14863 | 4/1998 |
| WO | WO-98/29886 A1 | 7/1998 |
| WO | WO-98/43202 A1 | 10/1998 |
| WO | WO-99/49443 | 9/1999 |
| WO | WO-00/79772 | 12/2000 |
| WO | WO-2001/002949 | 1/2001 |
| WO | WO-2001/044912 | 6/2001 |
| WO | WO-2001/74133 A2 | 10/2001 |
| WO | WO-2002/08881 | 1/2002 |
| WO | WO-02/080210 A1 | 10/2002 |
| WO | WO-02/089047 A1 | 11/2002 |
| WO | WO-02/095564 A1 | 11/2002 |
| WO | WO-2003/025960 | 3/2003 |
| WO | WO-03/044645 | 5/2003 |
| WO | WO-03/044956 | 5/2003 |
| WO | WO-2003/088176 | 10/2003 |
| WO | WO-2003/090008 | 10/2003 |
| WO | WO-2004/001573 | 12/2003 |
| WO | WO-2004/025449 A2 | 3/2004 |
| WO | WO-2004/025449 A3 | 3/2004 |
| WO | WO-2004/040606 | 5/2004 |
| WO | WO-2004/091956 | 10/2004 |
| WO | WO-2004/091956 A2 | 10/2004 |
| WO | WO-2005/055620 | 6/2005 |
| WO | WO-2005/064442 A1 | 7/2005 |
| WO | WO-2005/076117 | 8/2005 |
| WO | WO-2005/114369 | 12/2005 |
| WO | WO-2005/124526 | 12/2005 |
| WO | WO-2006/020305 | 2/2006 |
| WO | WO-2006/021211 | 3/2006 |
| WO | WO-2006/037545 | 4/2006 |
| WO | WO 2006/104745 | 10/2006 |
| WO | WO-2006/135127 | 12/2006 |
| WO | WO-2007/025858 | 3/2007 |
| WO | WO-2007/078477 | 7/2007 |
| WO | WO-2007/084467 | 7/2007 |
| WO | WO-2007/089766 | 8/2007 |
| WO | WO-2008/007372 | 1/2008 |
| WO | WO-2008/045414 | 4/2008 |
| WO | WO-2008/045833 | 4/2008 |
| WO | WO-2008/094791 A2 | 8/2008 |
| WO | WO-2008/094791 A3 | 8/2008 |

OTHER PUBLICATIONS

Prest et al., U.S. Office Action dated Jan. 11, 2013, directed to U.S. Appl. No. 13/544,527; 8 pages.
"About Quicktip®" www.logicad3d.com/docs/gt.html, downloaded Apr. 8, 2002.
"Apple Presents iPod: Ultra-Portable MP3 Music Player Puts 1,000 Songs in Your Pocket," retreived from http://www.apple.com/pr/library/2001/oct/23ipod.html on Oct. 23, 2001.
"Atari VCS/2600 Peripherals," www.classicgaming.com/gamingmuseum/2006p.html, downloaded Feb. 28, 2007, pp. 1-15.
Ahl, David, "Controller Update," Creative Computing Vo. 9, No. 12, Dec. 1983.
Ahmad, "A Usable Real-Time 3D Hand Tracker," Proceedings of the 28th Asilomar Conference on Signals, Systems and Computers—Part 2 (of 2) vol. 2 (Oct. 1994).
Baig, E.C., "Your PC Just Might Need a Mouse," U.S. News & World Report 108(22) (Jun. 4, 1990).
Bang & Olufsen Telecom a/s. (2000). BeoCom 6000 User Guide; 53 pages.
Bartimo, Jim, "The Portables: Travelling Quickly," Computerworld (Nov. 14, 1983).
Boling, Douglas (1993) "Programming Microsoft Windows CE.NET," p. 109.
Bray, "Phosphors help switch on xenon," Physics in Action, pp. 1-3, Apr. 1999.
Brink et al., "Pumped-up portables," U.S. News & World Report 116(21) (May 30, 1994).
Brown et al., "Windows on Tablets as a Means of Achieving Virtual Input Devices," Human-Computer Interaction—INTERACT '90 (1990).
Buxton et al., "Issues and Techniques in Touch-Sensitive Tablet Input," Computer Graphics 19(3), Proceedings of SIGGRAPH '85 (1985).
Chapweske, Adam "PS/2 Mouse/Keyboard Protocol," 1999, http://panda.cs.ndsu.nodak.edu/~achapwes/PICmicro/PS2/ps2.htm.
Chen et al., "A Study in Interactive 3-D Rotation Using 2-D Control Devices," Computer Graphics 22(4) (Aug. 1988).
De Meyer, Kevin, "Crystal Optical Mouse," Feb. 14, 2002, Heatseekerz, Web Article 19.
"Diamond Multimedia Announces Rio PMP300 Portable MP3 Music Player," located at http://news.harmony-central.com/Newp/1998/Rio-PMP300.html visited on May 5, 2008. (4 pages).
Evans et al., "Tablet-based Valuators that Provide One, Two, or Three Degrees of Freedom," Computer Grahics 15(3) (Aug. 1981).
EVB Elektronik "TSOP6238 IR Receiver Modules for Infrared Remote Control Systems" dated Jan. 2004 1 page.
Fiore, "Zen Touchpad," Cornell University, May 2000.
Gadgetboy, "Point and click with the latest mice," CNET Asia Product Review, www.asia.cnet.com/reviews...are/gadgetboy/0,39001770,380235900,00.htm, downloaded Dec. 5, 2001.
Gfroerer, "Photoluminescence in Analysis of Surfaces and Interfaces," Encyclopedia of Analytical Chemistry, pp. 1-23, Copyright John Wiley & Sons Ltd, Chichester, 2000.
Interlink Electronics, VersaPad: Integration Guide, © 1998 (VersaPad), pp. 1-35.
Jesitus, John, "Broken promies?", Industry Week/IW 246(20) (Nov. 3, 1997).
Kobayashi (1996) "Design of Dynamic Soundscape: Mapping Time to Space for Audio Browsing with Simultaneous Listening," Thesis submitted to Program in Media Arts and Sciences at the Massachusetts Institute of Technology, (58 pages).
Kobayashi et al. (1997) "Dynamic Soundscape: Mapping Time to Space for Audio Browsing," Computer Human Interaction: 16 pages.
Kobayashi et al. (1994) "Development of the Touch Switches with the Click Response," Koukuu Denshi Gihou No. 17, pp. 44-48 (published by the Japan Aviation Electronics Industry, Ltd.).
Letter re: Bang & Olufsen a/s by David Safran, Nixon Peabody, LLP, May 21, 2004, with BeoCom 6000 Sales Training Brochure, 7 pages.
Luna Technologies International, Inc., LUNA Photoluminescent Safety Products, "Photoluminescence—What is Photoluminescence?" from website at http://www.lunaplast.com/photoluminescence.com on Dec. 27, 2005.
"Manufactures," Laser Focus World, Buyers Guide '96, 31(12) (Dec. 1995).
Mims, Forrest M., III, "A Few Quick Pointers; Mouses, Touch Screens, Touch Pads, Light Pads, and The Like Can Make System Easier to Use," Computers & Electronics (22) (May 1984).

(56) References Cited

OTHER PUBLICATIONS

Nass, Richard, "Touchpad input device goes digital to give portable systems a desktop 'mouse-like' feel," Electronic Design 44(18) (Sep. 3, 1996).
"National Design Engineering Show," Design News 52(5) (Mar. 4, 1996).
"Neuros MP3 Digital Audio Computer," www.neurosaudio.com, downloaded Apr. 9, 2003.
"OEM Touchpad Modules" website www.glidepoint.com/sales/modules.index.shtml, downloaded Feb. 13, 2002.
"Preview of exhibitor booths at the Philadelphia show," Air Conditioning, Heating & News 200(2) (Jan. 13, 1997).
"Product news," Design News 53(9) (May 5, 1997).
"Product news," Design News 53(11) (Jun. 9, 1997).
"Product Overview—ErgoCommander®," www.logicad3d.com/products/ErgoCommander.htm, downloaded Apr. 8, 2002.
"Product Overview—SpaceMouse® Classic," www.logicad3d.com/products/Classic.htm, downloaded Apr. 8, 2002.
Perenson, Melissa, "New & Improved: Touchpad Redux," PC Magazine (Sep. 10, 1996).
Petersen, Marty, "Koala Pad Touch Tablet & Micro Illustrator Software," InfoWorld (Oct. 10, 1983).
Petruzzellis, "Force-Sensing Resistors," Electronics Now 64(3) (Mar. 1993).
Photographs of Innovation 2000 Best of Show Award Presented at the 2000 Int'l CES Innovations Design & Engineering Showcase, Jan. 6, 2000, 1 page.
SanDisk Sansa Connect User Guide, 2007; 29 pages.
Soderholm, Lars G., "Sensing Systems for 'Touch and Feel,'" Design News (May 8, 1989): pp. 72-76.
Sony presents "Choice Without Compromise" at IBC '97 M2 Presswire (Jul. 24, 1997).
Spiwak, Marc, "A Great New Wireless Keyboard," Popular Electronics 14(12) (Dec. 1997).
Spiwak, Marc, "A Pair of Unusual Controllers," Popular Electronics 14(4) (Apr. 1997).
Sylvania, "Intellvision™ Intelligent Television Master Component Service Manual," pp. 1, 2 and 8, 1979.
"System Service and Troubleshooting Manual," www.dsplib.com/intv/Master, downloaded Dec. 11, 2002.
"Synaptics Tough Pad Interfacing Guide," Second Edition, Mar. 25, 1998, Synaptics, Inc., San Jose, CA, pp. 1-90.
Tessler, Franklin, "Point Pad," Macworld 12(10) (Oct. 1995).
Tessler, Franklin, "Touchpads," Macworld 13(2) (Feb. 1996).
Tessler, Franklin, "Smart Input: How to Chose from the New Generation of Innovative Input Devices," Macworld 13(5) (May 1996).
Translation of Trekstor's Defense Statement to the District Court Mannheim of May 23, 2008; 37 pages.
"Triax Custom Controllers due; Video Game Controllers," HFD—The Weekly Home Furnishing Newspaper 67(1) (Jan. 4, 1993).
Robbin, U.S. Appl. No. 60/346,237 entitled, "Method and System for List Scrolling," filed Oct. 22, 2001.
Zadesky et al., U.S. Appl. No. 60/359,551 entitled "Touchpad for Handheld Device," filed Feb. 25, 2002.
Robbin et al., U.S. Appl. No. 60/387,692 entitled "Method and Apparatus for Use of Rotational User Inputs," filed Jun. 10, 2002.
Robbin et al., U.S. Appl. No. 60/399,806 entitled "Graphical User Interface and Methods of Use Thereof in a Multimedia Player," filed Jul. 30, 2002.
Grignon et al., U.S. Appl. No. 60/755,656, filed Dec. 30, 2005, entitled "Touch Pad with Feedback".
Elias et al., U.S. Appl. No. 60/522,107, filed Aug. 16, 2004, entitled, "A Method for Increasing the Spatial Resolution of Touch Sensitive Devices".
Hotelling, U.S. Appl. No. 60/658,777 titled "Multi-Functional Handheld Device," filed Mar. 4, 2005.
Zadesky et al., U.S. Appl. No. 60/714,609 entitled "Scrolling Input Arrangements Using Capacitive Sensors on a Flexible Membrane," filed Sep. 6, 2005.
Lampell et al., U.S. Appl. No. 60/810,423, filed Jun. 2, 2006, entitled "Techniques for Interactive Input to Portable Electronic Devices".
Prest et al., U.S. Appl. No. 60/850,662, filed Oct. 11, 2006, entitled, "Capacitive Scroll Wheel".
Bollinger, U.S. Appl. No. 60/858,404, filed Nov. 13, 2006, entitled "Method of Capacitively Sensing Finger Position".
Rothkopf, U.S. Appl. No. 60/935,854 titled "Compact Media Players," filed Sep. 4, 2007.
Rathnam et al., U.S. Appl. No. 60/992,056, filed Dec. 3, 2007, entitled, "Scroll Wheel Circuit Arrangements and Methods of Use Thereof".
Rathnam et al., U.S. Appl. No. 61/017,436 filed Dec. 28, 2007, entitled, "Multi-Touch Scroll Wheel Circuit Arrangements and Processing Methods".
Weber et al., U.S. Appl. No. 61/020,531, filed Jan. 11, 2008 entitled "Modifiable Clickwheel Text"; 11 pages.
Weber et al., U.S. Appl. No. 61/025,531, filed Feb. 1, 2008 entitled "Co-Extruded Materials and Methods"; 11 pages.
Fisher et al., U.S. Appl. No. 61/036,804 filed Mar. 14, 2008 entitled "Switchable Sensor Configurations"; 46 pages.
CN Office Action dated Dec. 29, 2006, directed to CN Application No. 200510103886.3, 25 pages.
Office Action of the IPO dated Sep. 16, 2011, directed to Taiwanese Patent Application No. 096138114 17 pages (English translation).
Office Action of the IPO dated Feb. 7, 2012, directed to Taiwanese Patent Application No. 096138114; 9 pages (English translation).
Fadell et al., U.S. Appl. No. 10/423,490 entitled "Media Player System," filed Apr. 25, 2003.
Zadesky, U.S. Appl. No. 11/592,679, filed Nov. 3, 2006.
Tsuk et al., U.S. Office Action dated Oct. 13, 2006, directed to U.S. Appl. No. 10/256,716; 16 pages.
Tsuk et al., U.S. Office Action dated Aug. 3, 2006, directed to U.S. Appl. No. 10/256,716; 15 pages.
Tsuk et al., U.S. Office Action dated Jan. 10, 2006, directed to U.S. Appl. No. 10/256,716; 12 pages.
Tsuk et al., U.S. Office Action dated Jun. 24, 2005, directed to U.S. Appl. No. 10/256,716; 12 pages.
Tsuk et al., U.S. Office Action dated Sep. 30, 2004, directed to U.S. Appl. No. 10/256,716; 11 pages.
Tsuk et al., U.S. Office Action dated Aug. 7, 2009, directed to U.S. Appl. No. 11/610,181; 20 pages.
Tsuk et al., U.S. Office Action dated Jul. 7, 2009, directed to U.S. Appl. No. 11/610,190; 24 pages.
Tsuk et al., U.S. Office Action dated Dec. 31, 2009, directed to U.S. Appl. No. 11/610,190; 25 pages.
Tsuk et al., U.S. Office Action dated Apr. 28, 2010, directed to U.S. Appl. No. 11/610,190; 29 pages.
Tsuk et al., U.S. Office Action dated Aug. 6, 2010, directed to U.S. Appl. No. 11/610,190; 30 pages.
Tsuk et al., U.S. Office Action dated Apr. 19, 2011, directed to U.S. Appl. No. 11/610,190; 25 pages.
Tsuk et al., U.S. Office Action dated Nov. 1, 2010, directed to U.S. Appl. No. 11/959,918; 8 pages.
Tsuk et al., U.S. Office Action dated Mar. 31, 2011, directed to U.S. Appl. No. 11/959,918; 9 pages.
Tsuk et al., U.S. Office Action dated Oct. 26, 2010, directed to U.S. Appl. No. 11/959,942; 27 pages.
Robbin et al., U.S. Office Action dated Jan. 18, 2007, directed to U.S. Appl. No. 10/259,159; 18 pages.
Robbin et al., U.S. Office Action dated Oct. 13, 2006, directed to U.S. Appl. No. 10/259,159; 18 pages.
Robbin et al., U.S. Office Action dated Aug. 3, 2006, directed to U.S. Appl. No. 10/259,159; 15 pages.
Robbin et al., U.S. Office Action dated Jan. 11, 2006, directed to U.S. Appl. No. 10/259,159; 15 pages.
Robbin et al., U.S. Office Action dated Jun. 16, 2005, directed to U.S. Appl. No. 10/259,159; 16 pages.
Robbin et al., U.S. Office Action dated Sep. 30, 2004, directed to U.S. Appl. No. 10/259,159; 14 pages.
Robbin et al., U.S. Office Action dated Aug. 10, 2009, directed to U.S. Appl. No. 11/610,376; 11 pages.

(56) References Cited

OTHER PUBLICATIONS

Robbin et al., U.S. Office Action dated Aug. 12, 2009, directed to U.S. Appl. No. 11/610,384; 20 pages.
Robbin et al., U.S. Office Action dated Oct. 29, 2010, directed to U.S. Appl. No. 11/838,845; 8 pages.
Robbin et al., U.S. Office Action dated Apr. 26, 2011, directed to U.S. Appl. No. 11/838,845; 9 pages.
Zadesky et al., U.S. Office Action dated Jul. 9, 2008, directed to U.S. Appl. No. 10/643,256; 12 pages.
Zadesky et al., U.S. Office Action dated Dec. 12, 2007, directed to U.S. Appl. No. 10/643,256; 12 pages.
Zadesky et al., U.S. Office Action dated Jul. 13, 2007, directed to U.S. Appl. No. 10/643,256; 13 pages.
Zadesky et al., U.S. Office Action dated Mar. 23, 2007, directed to U.S. Appl. No. 10/643,256; 11 pages.
Zadesky et al., U.S. Office Action dated Oct. 27, 2006, directed to U.S. Appl. No. 10/643,256; 14 pages.
Zadesky et al., U.S. Office Action dated Mar. 30, 2010, directed to U.S. Appl. No. 11/592,679; 13 pages.
Zadesky et al., U.S. Office Action dated Mar. 31, 2011, directed to U.S. Appl. No. 11/882,005; 7 pages.
Ng et al., U.S. Office Action dated Jan. 14, 2010, directed to U.S. Appl. No. 11/394,493; 20 pages.
Ng et al., U.S. Office Action dated Jun. 22, 2010, directed to U.S. Appl. No. 11/394,493; 14 pages.
Ng et al., U.S. Office Action dated Dec. 9, 2010, directed to U.S. Appl. No. 11/394,493; 13 pages.
Ng et al., U.S. Office Action dated Jan. 15, 2010, directed to U.S. Appl. No. 11/882,423; 22 pages.
Ng et al., U.S. Office Action dated Jul. 8, 2010, directed to U.S. Appl. No. 11/882,423; 19 pages.
Ng et al., U.S. Office Action dated Oct. 26, 2010, directed to U.S. Appl. No. 11/882,423; 18 pages.
Forsblad et al., U.S. Office Action dated Jun. 25, 2009, directed to U.S. Appl. No. 11/355,022; 18 pages.
Forsblad et al., U.S. Office Action dated Jan. 26, 2009, directed to U.S. Appl. No. 11/355,022; 15 pages.
Forsblad et al., U.S. Office Action dated Jan. 27, 2009, directed to U.S. Appl. No. 11/882,421; 15 pages.
Lampell, U.S. Office Action dated Sep. 15, 2009, directed to U.S. Appl. No. 11/530,807; 15 pages.
Lampell, U.S. Office Action dated Jun. 4, 2010, directed to U.S. Appl. No. 11/530,807; 15 pages.
Lampell, U.S. Office Action dated Dec. 3, 2010, directed to U.S. Appl. No. 11/530,807; 17 pages.
Lampell et al., U.S. Office Action dated Dec. 22, 2010, directed to U.S. Appl. No. 11/882,427; 16 pages.
Zadesky et al., U.S. Office Action dated Aug. 6, 2009, directed to U.S. Appl. No. 11/057,050; 30 pages.
Zadesky et al., U.S. Office Action dated Feb. 20, 2009, directed to U.S. Appl. No. 11/057,050; 25 pages.
Zadesky et al., U.S. Office Action dated Dec. 24, 2008, directed to U.S. Appl. No. 11/057,050; 25 pages.
Zadesky et al., U.S. Office Action dated Nov. 26, 2008, directed to U.S. Appl. No. 11/057,050; 25 pages.
Zadesky et al, U.S. Office Action dated Aug. 19, 2008, directed to U.S. Appl. No. 11/057,050; 23 pages.
Zadesky et al., U.S. Office Action dated Nov. 20, 2007, directed to U.S. Appl. No. 11/057,050; 33 pages.
Zadesky et al., U.S. Office Action dated Oct. 4, 2010, directed to U.S. Appl. No. 11/057,050; 31 pages.
Zadesky et al., U.S. Office Action dated Mar. 5, 2009, directed to U.S. Appl. No. 11/477,469; 12 pages.
Zadesky et al., U.S. Office Action dated Feb. 4, 2010, directed to U.S. Appl. No. 11/477,469; 14 pages.
Zadesky et al., U.S. Office Action dated Nov. 16, 2010, directed to U.S. Appl. No. 11/477,469; 13 pages.
Prest et al., U.S. Office Action dated Jun. 22, 2010, directed to U.S. Appl. No. 11/812,383; 21 pages.
Prest et al., U.S. Office Action dated Jun. 22, 2010, directed to U.S. Appl. No. 11/878,132; 32 pages.
Prest et al., U.S. Office Action dated Jun. 22, 2010, directed to U.S. Appl. No. 11/882,882; 32 pages.
Prest et al., U.S. Office Action dated Jun. 23, 2010, directed to U.S. Appl. No. 11/812,384; 29 pages.
Prest et al., U.S. Office Action dated Jun. 22, 2010, directed to U.S. Appl. No. 11/882,890; 15 pages.
Prest et al., U.S. Office Action dated Jun. 23, 2010, directed to U.S. Appl. No. 11/882,889; 13 pages.
Bollinger et al., U.S. Office Action dated Jun. 25, 2010, directed to U.S. Appl. No. 11/842,724; 22 pages.
Bollinger et al., U.S. Office Action dated Mar. 21, 2011, directed to U.S. Appl. No. 11/842,724; 22 pages.
McKillop et al., U.S. Office Action dated Sep. 16, 2010, directed to U.S. Appl. No. 11/591,752; 14 pages.
McKillop et al., U.S. Office Action dated Mar. 24, 2011, directed to U.S. Appl. No. 11/591,752; 11 pages.
Zadesky et al., U.S. Office Action dated Jul. 30, 2004, directed to U.S. Appl. No. 10/188,182; 7 pages.
Zadesky et al., U.S. Office Action dated Sep. 21, 2005, directed to U.S. Appl. No. 10/188,182; 10 pages.
Zadesky et al., U.S. Office Action dated Mar. 4, 2004, directed to U.S. Appl. No. 10/188,182; 8 pages.
Zadesky et al., U.S. Office Action dated Oct. 4, 2007, directed to U.S. Appl. No. 11/386,238; 12 pages.
Zadesky et al.., U.S. Office Action dated Oct. 4, 2007, directed to U.S. Appl. No. 11/806,957; 14 pages.
Zadesky et al., U.S. Office Action dated Aug. 2, 2010, directed to U.S. Appl. No. 11/882,004; 9 pages.
Zadesky et al, U.S. Office Action dated Feb. 1, 2011, directed to U.S. Appl. No. 11/882,004; 16 pages.
Zadesky et al., U.S. Office Action dated Sep. 29, 2010, directed to U.S. Appl. No. 11/882,003; 13 pages.
Zadesky et al., U.S. Office Action dated Mar. 16, 2011, directed to U.S. Appl. No. 11/882,003; 12 pages.
Marriott et al., U.S. Office Action dated Jan. 30, 2008, directed to U.S. Appl. No. 10/722,948; 17 pages.
Marriott et al., U.S. Office Action dated Jul. 13, 2007, directed to U.S. Appl. No. 10/722,948; 15 pages.
Marriott et al., U.S. Office Action dated Dec. 12, 2006, directed to U.S. Appl. No. 10/722,948; 14 pages.
Marriott et al., U.S. Office Action dated Jun. 2, 2006, directed to U.S. Appl. No. 10/722,948; 12 pages.
Marriott et al., U.S. Office Action dated Aug. 19, 2010, directed to U.S. Appl. No. 11/882,422; 13 pages.
Hotelling, U.S. Office Action dated Sep. 1, 2009, directed to U.S. Appl. No. 11/482,286; 14 pages.
Hotelling, U.S. Office Action dated Jan. 25, 2010, directed to U.S. Appl. No. 11/482,286; 17 pages.
Hotelling, U.S. Office Action dated Jun. 9, 2010, directed to U.S. Appl. No. 11/482,286; 21 pages.
Hotelling, U.S. Office Action dated Oct. 1, 2010, directed to U.S. Appl. No. 11/482,286; 28 pages.
Hotelling, U.S. Office Action dated Dec. 8, 2010, directed to U.S. Appl. No. 11/482,286; 33 pages.
Hotelling, U.S. Office Action dated Aug. 18, 2010, directed to U.S. Appl. No. 11/882,424; 16 pages.
Hotelling et al., U.S. Office Action dated Jul. 24, 2009, directed to U.S. Appl. No. 11/483,008; 17 pages.
Hotelling et al., U.S. Office Action dated Mar. 30, 2010, directed to U.S. Appl. No. 11/483,008; 20 pages.
Hotelling et al., U.S. Office Action dated Oct. 27, 2010, directed to U.S. Appl. No. 11/483,008; 23 pages.
Hotelling et al., U.S. Office Action dated Jul. 27, 2009, directed to U.S. Appl. No. 11/882,420; 17 pages.
Elias et al., U.S. Office Action dated Aug. 4, 2009, directed to U.S. Appl. No. 11/203,692; 12 pages.
Elias et al., U.S. Office Action dated Feb. 23, 2009, directed to U.S. Appl. No. 11/203,692; 13 pages.
Elias et al., U.S. Office Action dated Sep. 17, 2008, directed to U.S. Appl. No. 11/203,692; 8 pages.

(56) References Cited

OTHER PUBLICATIONS

Elias et al., U.S. Office Action dated Mar. 30, 2010, directed to U.S. Appl. No. 11/203,692; 15 pages.
Elias et al., U.S. Office Action dated Jun. 11, 2010, directed to U.S. Appl. No. 11/203,692; 17 pages.
Elias et al., U.S. Office Action dated Nov. 22, 2010, directed to U.S. Appl. No. 11/203,692; 6 pages.
Bull, U.S. Office Action dated Jul. 9, 2010, directed to U.S. Appl. No. 11/849,801; 13 pages (20115.00).
Bull, U.S. Office Action dated Feb. 4, 2011, directed to U.S. Appl. No. 11/849,801; 22 pages (20115.00).
Weber et al., U.S. Office Action dated Jun. 7, 2010, directed to U.S. Appl. No. 11/856,530; 15 pages.
Weber et al, U.S. Office Action dated Jan. 7, 2011, directed to U.S. Appl. No. 11/856,530; 13 pages.
Rathnam et al., U.S. Office Action dated Mar. 24, 2011, directed to U.S. Appl. No. 12/205,757; 14 pages.
Weber et al., U.S. Office Action dated Oct. 13, 2010, directed to U.S. Appl. No. 12/205,795; 15 pages.
Weber et al., U.S. Office Action dated Jan. 7, 2011, directed to U.S. Appl. No. 12/205,795; 21 pages.
Weber et al., U.S. Office Action dated Feb. 17, 2011, directed to U.S. Appl. No. 12/844,502; 11 pages.
Lynch et al., U.S. Office Action dated Oct. 5, 2009, directed to U.S. Appl. No. 11/499,360; 7 pages.
Lynch et al., U.S. Office Action dated Jan. 27, 2010, directed to U.S. Appl. No. 11/499,360; 8 pages.
Prest et al., U.S. Office Action dated May 16, 2013, directed to U.S. Appl. No. 13/544,527; 9 pages.
Prest et al., U.S. Office Action dated Sep. 27, 2013, directed to U.S. Appl. No. 13/544,527; 9 pages.
Prest et al., U.S. Office Action dated Feb. 6, 2014, directed to U.S. Appl. No. 13/544,527; 9 pages.
Office Action dated Oct. 16, 2014, directed to Taiwanese Patent Application No. 101128495; 12 pages.
International Search Report dated Dec. 6, 2007, directed to related International Application No. PCT/US2007/015501, three pages.
International Search Report dated Mar. 12, 2008, directed to counterpart International Application No. PCT/US2007/080708, three pages.
Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.
Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages.
Rubine, D.H. (May 1992). "Combining Gestures and Direct Manipulation," CHI ' 92, pp. 659-660.
Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.
Final Office Action dated Aug. 27, 2018, for U.S. Appl. No. 15/274,754, filed Sep. 23, 2016, 12 pages.
Non-Final Office Action dated Sep. 5, 2018, for U.S. Appl. No. 16/011,517, filed Jun. 18, 2018, eleven pages.
"Der Klangmeister," Connect Magazine, Aug. 1998.
"Design News literature plus," Design News 51(24) (Dec. 18, 1995).
"How do touchscreen monitors know where you're touching?" obtained from http://www.electronics.howstuffworks.com/question716.html generated Jul. 7, 2008; 2 pages.
"T9® Txt Input for Keypad Devices," http://tegic.com, Nov. 18, 2005, one page.
Alps Electric introduces the GlidePoint Wave Keyboard; combines a gently curved design with Alps' advanced GlidePoint Technology, Business Wire, (Oct. 21, 1996).
Alps Electric Ships GlidePoint Keyboard for the Macintosh; Includes a GlidePoint Touchpad, Erase-Eaze Backspace Key and Contoured Wrist Rest, Business Wire, (Jul. 1, 1996).
Apple Computer, Inc., "Block Diagram and Buses" Apple Developer Connection, Aug. 3, 2004 downloaded from the Internet from http://developer.apple.com/documentation/Hardware/Developer_Notes/Macintosh_CPUs-G . . . (4 pages).
Apple Computer, Inc., "Powerbook G4" Technology Overview, Apr. 2004 (29 pages).
Apple Presents iPod: Ultra-Portable MP3 Music Player Puts 1,000 Songs in Your Pocket, retreived from htto:l/www.annle.com/or/librarv/2001/oct/23iood.html on Oct. 23, 2001.
Apple Unveils Optical Mouse and New Pro Keyboard, Press Release, Jul. 19, 2000.
APS show guide to exhibitors, Physics Today, 49(3) (Mar. 1996).
Atari VCS/2600 Peripherals, www.classicgaming.com downloaded Feb. 28, 2007, pp. 1-15.
Casario, M., "Hands on Macromedia World: Touch Screen Keypad for Mobile Phone by DoCoMo," printed Nov. 18, 2005, 1 page.
Day, B. "Will Cell Phones Render iPods Obsolete?" http://webblogs.javanet/pub/wig/883, printed Dec. 12, 2005, 3 pages.
Delta II™ Keypads, "Introducing the Ultimate Smartphone Keypad,"http://www.chicagologic.com, printed Nov. 18, 2005, 2 pages.
DigitWireless, Fastap™ http://www/digitwireless.com/about/faq.html, Dec. 6, 2005; 5pages.
DigitWireless, "Fastap™ Keypads Redefine Mobile Phones," http://www/digitwireless.com printed Nov. 18, 2005; ten pages.
Extended European Search Report dated Mar. 4, 2015, for EP Patent Application No. 14188138.3; nine pages.
Extended European Search Report dated Sep. 6, 2011, directed to EP Patent Application No. 10011508.8; 10 pages.
Final Office Action dated Sep. 27, 2011, for U.S. Appl. No. 11/057,050, filed Feb. 11, 2005, 37 pages.
Final Office Action dated Oct. 26, 2011, for U.S. Appl. No. 11/057,050, filed Feb. 11, 2005, 37 pages.
Final Office Action dated Oct. 25, 2012, for U.S. Appl. No. 11/882,005, filed Jul. 30, 2007, 12 pages.
Final Office Action dated Apr. 15, 2013, for U.S. Appl. No. 11/882,004, filed Jul. 30, 2007, 18 pages.
Final Office Action dated Jun. 25, 2015, for U.S. Appl. No. 11/477,469, filed Jun. 28, 2006, 14 pages.
Final Office Action dated Aug. 24, 2015, for U.S. Appl. No. 14/527,585, filed Oct. 29, 2014, 12 pages.
Final Office Action dated Jan. 12, 2016, for U.S. Appl. No. 14/678,578, filed Apr. 3, 2015, 10 pages.
Final Office Action dated Feb. 4, 2016, for U.S. Appl. No. 14/535,101, filed Nov. 6, 2014, seven pages.
Final Office Action dated Feb. 24, 2016, for U.S. Appl. No. 14/850,905, filed Sep. 10, 2015, 10 pages.
Final Office Action dated Apr. 20, 2016, for U.S. Appl. No. 14/850,901, filed Sep. 10, 2015, 11 pages.
Final Office Action dated Aug. 23, 2016, for U.S. Appl. No. 11/057,050, filed Feb. 11, 2005, 22 pages.
Final Office Action dated Sep. 22, 2016, for U.S. Appl. No. 14/527,585, filed Oct. 29, 2014, 14 pages.
Final Office Action dated Oct. 24, 2016, for U.S. Appl. No. 14/850,905, filed Sep. 10, 2015, 12 pages.
Final Office Action dated Oct. 28, 2016, for U.S. Appl. No. 14/678,578, filed Apr. 3, 2015, 10 pages.
Final Office Action dated Mar. 21, 2017, for U.S. Appl. No. 15/017,371, filed Feb. 5, 2016, 42 pages.
Final Office Action dated Apr. 28, 2017, for U.S. Appl. No. 14/535,101, filed Nov. 6, 2014, nine pages.
Final Office Action dated May 15, 2017, for U.S. Appl. No. 14/850,901, filed Sep. 10, 2015, fourteen pages.
Final Office Action dated Sep. 22, 2017, for U.S. Appl. No. 14/527,585, filed Oct. 29, 2014, eight pages.
Final Office Action dated Oct. 5, 2017, for U.S. Appl. No. 14/850,905, filed Sep. 10, 2015, 16 pages.
Final Office Action dated Dec. 15, 2017, for U.S. Appl. No. 14/678,578, filed Apr. 3, 2015, eleven pages.

(56) References Cited

OTHER PUBLICATIONS

Final Office Action dated Jan. 29, 2018, for U.S. Appl. No. 11/882,004, filed Jul. 30, 2007, 15 pages.
Final Office Action dated Jan. 31, 2018, for U.S. Appl. No. 14/253,299, filed Apr. 15, 2014, 30 pages.
Final Office Action dated May 18, 2018, for U.S. Appl. No. 14/535,101, filed Nov. 6, 2014, nine pages.
Gibbs, K. "I've Got a Suggestion," posted on the Google Blog, Dec. 10, 2004, http://googleblog.blogspot.com.
Google, "Google Suggest FAQ," Google.com, retrieved on Apr. 1, 2009, from http://labs.google.com/suggestfaq.
Hotelling et al., U.S. Office Action dated Apr. 12, 2012, directed to U.S. Appl. No. 13/236,255; 20 pages.
Hotelling et al., U.S. Office Action dated Oct. 1, 2012, directed to U.S. Appl. No. 13/236,255; 21 pages.
ISR dated Oct. 15, 2003 directed to corresponding application No. PCT/US2002/33805; 3 pages.
ISR dated Oct. 16, 2003 directed to corresponding application No. PCT/US02/33861; 3 pages.
ISR dated May 7, 2007, directed to corresponding application No. PCT/US2006/045682; 2 pages.
Mattel. (2002). "System Service and Troubleshooting Manual descriptions," *Mattel Electronics Intellivision Intelligent Television*, located at www.dsplib.com/i ntv . . . , last visited Dec. 11, 2002, one page.
McAlister, J. "News + Suggest Join Forces," Apr. 28, 2006, posted on the Google Blog, http://googleblog.blogspot.com.
McKillop et al., U.S. Office Action dated Oct. 25, 2012, directed to U.S. Appl. No. 11/591,752; 11 pages.
MobileTouch "Synaptics: Handy Wie Einen iPod Bedienen," Sep. 21, 2004, 1 page, http://www.golem.de/0409/33706.html.
Nokia, "7280 Bedienungsanleitung" 2005, pp. 1-149, http://web.archive.org/web/20051222023851/http://nds1.nikia.com/phones/files/guides/nokia7280_UDG-de.pdf.
Nokia, "7280 Interaktive Demos" screenshot Nov. 25, 2005, 1 page, http://web.archive.org/web/2005112502636/europe.nokia.com/support/tutorials/7280/german/index.htm.
Nokia, "Nokia 7280 User manual," Nov. 25, 2004, 132 pages, http://nds1.nokia.com/phones/files/guides/Nokia_7280_UG-en.pdf.
Nokia, "Nokia 7280: Interactive Demonstrations," 7 pages, 2004, http://nokia.com/EUROPE_NOKIA_COM_3/r2/support/tutorials/7280/english/indes.html.
Non-Final Office Action dated May 25, 2011, for U.S. Appl. No. 11/057,050, filed Feb. 11, 2005, 32 pages.
Non-Final Office Action dated Mar. 6, 2012, for U.S. Appl. No. 11/591,752, filed Nov. 1, 2006, 11 pages.
Non-Final Office Action dated Jun. 7, 2012, for U.S. Appl. No. 11/882,005, filed Jul. 30, 2007, 10 pages.
Non-Final Office Action dated Jul. 11, 2013, for U.S. Appl. No. 11/882,005, filed Jul. 30, 2007, 12 pages.
Non-Final Office Action dated Dec. 19, 2014, for U.S. Appl. No. 14/166,784, filed Jan. 28, 2014, 11 pages.
Non-Final Office Action dated Jan. 2, 2015, for U.S. Appl. No. 11/477,469, filed Jun. 28, 2006, 13 pages.
Non-Final Office Action dated Feb. 3, 2015, for U.S. Appl. No. 14/527,585, filed Oct. 29, 2014, 11 pages.
Non-Final Office Action dated May 12, 2015, for U.S. Appl. No. 14/535,101, filed Nov. 6, 2014, seven pages.
Non-Final Office Action dated Jun. 29, 2015, for U.S. Appl. No. 14/678,578, filed Apr. 3, 2015, 13 pages.
Non-Final Office Action dated Nov. 12, 2015, for U.S. Appl. No. 14/850,901, Sep. 10, 2015, 10 pages.
Non-Final Office Action dated Nov. 16, 2015, for U.S. Appl. No. 14/850,905, filed Sep. 10, 2015, 8 pages.
Non-Final Office Action dated Mar. 11, 2016, for U.S. Appl. No. 11/057,050, filed Feb. 11, 2005, 18 pages.
Non-Final Office Action dated Mar. 14, 2016, for U.S. Appl. No. 14/527,585, filed Oct. 29, 2014, 13 pages.
Non-Final Office Action dated Jul. 18, 2016, for U.S. Appl. No. 14/850,905, filed Sep. 10, 2015, twelve pages.
Non-Final Office Action dated Aug. 11, 2016, for U.S. Appl. No. 14/535,101, filed Nov. 6, 2014, eight pages.
Non-Final Office Action dated Sep. 9, 2016, for U.S. Appl. No. 14/850,901, filed Sep. 10, 2015, 12 pages.
Non-Final Office Action dated Mar. 24, 2017, for U.S. Appl. No. 14/527,585, filed Oct. 29, 2014, eight pages.
Non-Final Office Action dated Mar. 27, 2017, for U.S. Appl. No. 14/850,905, filed Sep. 10, 2015, twelve pages.
Non-Final Office Action dated May 11, 2017, for U.S. Appl. No. 14/678,578, filed Apr. 3, 2015, 14 pages.
Non-Final Office Action dated Jun. 16, 2017, for U.S. Appl. No. 11/882,004, filed Jul. 30, 2007, 15 pages.
Non-Final Office Action dated Jul. 25, 2017, for U.S. Appl. No. 14/253,299, filed Apr. 15, 2014, 29 pages.
Non-Final Office Action dated Nov. 15, 2017, for U.S. Appl. No. 14/535,101, filed Nov. 6, 2014, eight pages.
Non-Final Office Action dated Nov. 17, 2017, for U.S. Appl. No. 15/274,747, filed Sep. 23, 2016, 27 pages.
Non-Final Office Action dated Nov. 30, 2017, for U.S. Appl. No. 15/274,754, filed Sep. 23, 2016, 13 pages.
Non-Final Office Action dated Feb. 8, 2018, for U.S. Appl. No. 14/850,901, filed Sep. 10, 2015, seven pages.
Non-Final Office Action dated Apr. 4, 2018, for U.S. Appl. No. 14/678,578, filed Apr. 3, 2015, ten pages.
Non-Final Office Action dated Apr. 9, 2018, for U.S. Appl. No. 14/527,585, filed Oct. 29, 2014, ten pages.
Notice of Allowance dated Sep. 14, 2015, for U.S. Appl. No. 14/166,784, filed Jan. 28, 2014, eight pages.
Notice of Allowance dated Dec. 18, 2015, for U.S. Appl. No. 11/057,050, filed Feb. 11, 2005, nine pages.
Notice of Allowance dated Feb. 26, 2016, for U.S. Appl. No. 14/166,784, filed Jan. 28, 2014, seven pages.
Notice of Allowance dated Feb. 9, 2018, for U.S. Appl. No. 14/850,905, filed Sep. 10, 2015, eight pages.
Notice of Allowance dated Jul. 3, 2018, for U.S. Appl. No. 14/850,905, filed Sep. 10, 2015, five pages.
O'Neal, W., Sr. E., et al., "Smart Phones with Hidden Keybaords," printed Nov. 18, 2005, 3 pp., http://msc.com/4250-6452_16-6229969-1.html.
Phoneyworld, "You heard of Touch Screens Now Check Out Touch Keys" printed Nov. 18, 2005, 2 pages, http://www.phoneyworld.com.
Sears, A., et al., "Data Entry for Mobile Devices Using Soft Keyboards: Understanding the Effects of Keybaord Size and User Tasks," Abstract, Int'l Journal of Human-Computer Interaction, 2003, vol. 16, No. 2, 23 pages.
Solutions for Humans, "Compare Keyboards with the Keyboard Compatibility Chart, Learn More About Alternative Keyboards," printed Dec. 8, 2005, 5 pages, http://www.keyalt.com/kkeybrdp.htm.
Subatai Ahmad, "A Usable Real-Time 3D Hand Tracker," Proceedings of the 28$^{th}$ Asilomar Conference on Signals, Systems and Computers—Part 2 (of 2), vol. 2 (Oct. 1994).
Technology Loan Catalog, "Devices," printed Jun. 6, 2008, 9 pages http://www.tsbvi.edu/outreach/techloan/catalog.html.
Textually, "LG Develops New Touch Pad Cell Phones," printed Nov. 18, 2005, 1 page, http://textually.org/textually/archives/2005/06/009903.htm.
Textually, "Microsoft New-Smart Phone Interface: Your Thumb," printed Nov. 18, 2005, 2 pages, http://www.textually.org.
Textually, "Samsung Releases Keyboard Phone in US," printed Nov. 18, 2005, 1 page, http://www.textually.org/textually/archives/2005/11/010482.htm.
Torrone, P., "Google Suggest: The Movie," Dec. 11, 2004, posted on www.Engadget.com.
TouchPad Advanced Features, Synaptics, "Enriching the Interaction Between Humans and Intelligent Devices," Downloaded Aug. 16, 2004 (2 pages) http://www.synaptics.com/products/touchpad_features.cfm.
Touchpad, Notebook PC Manual, Acer Information Co. Ltd., Feb. 16, 2005, pp. 11-12.

(56) References Cited

OTHER PUBLICATIONS

Trackpad, Apple Developer Connection (last updated Apr. 19, 2004, printed Aug. 19, 2004) (3 pages) http://developer.apple.com/documentation/Hardware/Developer_Notes/Macintosh_CPUs-. . .
Web Archive: web.archive.org/web/*/http://nds1.nokia.com/phones/files/guides/Nokia_7280_UG_en.pdf; Jun. 19, 2009.
WikiPodLinux, "Four-Button Keyboard," printed Dec. 5, 2005, 2 pages, http://ipodlinux.org/Four-Button_Keyboard.
WikiPodLinux, "Text Input (legacy)," downloaded Dec. 5, 2005, 8 pages, http://ipodlinux.org/Text_Input_%28legacy%29.
WikiPodLinux, "Text Input Concepts," Dec. 2005, printed Jun. 17, 2008, 3 pages, http://web/archive.org/web/20051211162524/http://ipodlinux.org/Text_Input_Concepts.
WikiPodLinux, "Text Input Methods," printed Dec. 5, 2005, 8 pages, http://ipodlinux.org/Text_Input_Methods.
Zadesky, S. P. et al., U.S. Office Action dated Dec. 14, 2011, directed to U.S. Appl. No. 11/882,003; 11 pages.
Zadesky et al, U.S. Office Action dated Jan. 17, 2012, directed to U.S. Appl. No. 11/882,004; 13 pages.
Zadesky et al., U.S. Office Action dated Jun. 15, 2012, directed to U.S. Appl. No. 11/882,003; 12 pages.
Zadesky et al, U.S. Office Action dated Jun. 19, 2012, directed to U.S. Appl. No. 11/882,004; 13 pages.
Zadesky et al, U.S. Office Action dated Oct. 26, 2012, directed to U.S. Appl. No. 11/882,004; 16 pages.
Zadesky et al., U.S. Office Action dated Feb. 7, 2014, directed to U.S. Appl. No. 11/882,004; 20 pages.
Zadesky et al., U.S. Office Action dated Jul. 10, 2014, directed to U.S. Appl. No. 11/882,004; 18 pages.
Zadesky et al., U.S. Office Action dated Nov. 21, 2014, directed to U.S. Appl. No. 11/882,004; 18 pages.
Zadesky et al., U.S. Office Action dated Mar. 24, 2015, directed to U.S. Appl. No. 11/882,004; 20 pages.
Zadesky et al., U.S. Office Action dated Jun. 10, 2015, directed to U.S. Appl. No. 11/882,004; 21 pages.
Zadesky et al., U.S. Office Action dated Sep. 10, 2015, directed to U.S. Appl. No. 14/253,299; 19 pages.
Zadesky et al., U.S. Office Action dated Feb. 4, 2016, directed to U.S. Appl. No. 14/253,299; 18 pages.
Zadesky et al., U.S. Office Action dated Jun. 20, 2016, directed to U.S. Appl. No. 14/253,299; 25 pages.
Final Office Action dated Jul. 31, 2018, for U.S. Appl. No. 15/274,747, filed Sep. 23, 2016, 19 pages.

\* cited by examiner

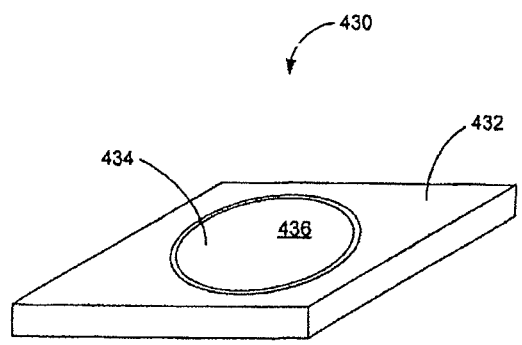
FIG. 1
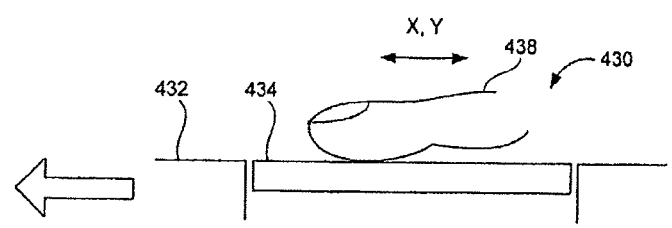
TRACKING SIGNAL    FIG. 2A
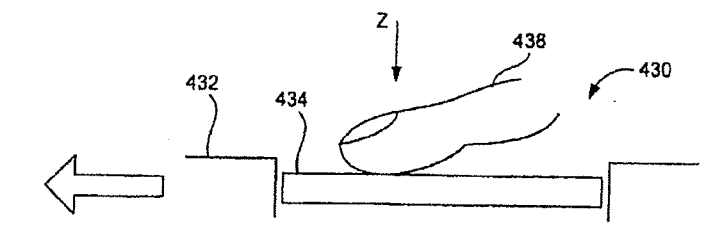
BUTTON SIGNAL    FIG. 2B

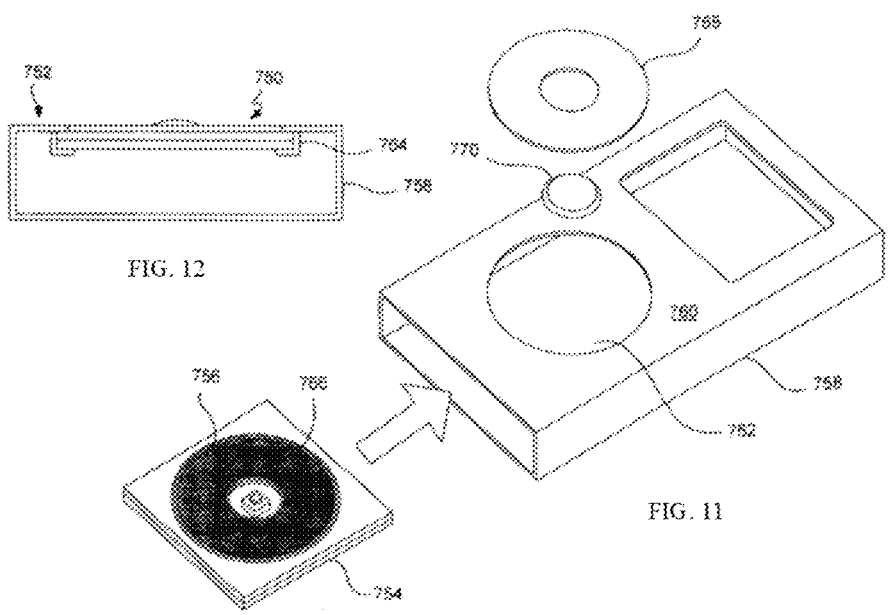

GIMBALLED SCROLL WHEEL

CROSS-REFERENCE TO RELATED APPLICATION

This application is a continuation of Ser. No. 13/544,527, filed Jul. 9, 2012, which is a divisional of U.S. patent application Ser. No. 11/882,889, filed Aug. 6, 2007, which is a continuation application of U.S. patent application Ser. No. 11/812,383, filed Jun. 18, 2007, which claims the benefit of U.S. Provisional Application No. 60/850,662, filed Oct. 11, 2006, the entireties of which are incorporated herein by reference.

TECHNICAL FIELD

This relates to methods and devices in which data associated with a first input, such as a touch pad or touch screen, and data associated with a second input, such as a button, may both be used in combination to generate a single command.

BACKGROUND

Several kinds of input devices are known for performing operations in a computing device. Some examples of input devices include buttons, switches, keyboards, mice, trackballs, touch pads, joy sticks, touch screens and the like. Each of these devices has advantages and disadvantages that may be taken into account when designing an input apparatus for a computing device. The operations generally include moving a cursor and selecting items displayed on a display screen. The operations may also include paging, scrolling, panning, zooming, etc.

Some input devices are better configured to perform certain functions than other input devices. For example, touch pads and touch screens are useful for providing location information and buttons are useful for indicating selections. Since most computing devices perform several different functions, a combination of different input devices that are able to provide input in different manners is often desired.

In addition, many computing devices are designed to be portable, for example, media players, remote controls, personal digital assistants (PDAs), cellular phones, etc. Designing input devices for these portable devices presents some unique problems. For example, there is typically a push to increase the ability and, thus, the number of functions that these portable computing devices are able to perform. As the number of operations that these portable devices perform increases, the number of controls desired to control these operations and the complexity of these controls also typically increase. A competing concern is that there is also pressure to make portable computing devices smaller, and thus, more portable. However, as the size of these devices decreases, the amount of space in which to locate input devices also decreases.

Accordingly, a need exists for compact input device configurations that can be used to control a variety of different functions in a variety of different manners.

SUMMARY

Described herein are exemplary embodiments of devices, including computing devices, that use at least two different input devices substantially simultaneously to generate a single command. One example of two different input devices may include a movement detector, such as a mechanical switch, and a position indicator, such as a touch pad or touch screen. By using such different input devices in combination, the number of operations that can be controlled by these two input devices can be increased. In addition, the benefits associated with each of these two different input devices can be used while making the command. These input devices may also be layered, one on top of the other, further decreasing the amount of space on a device used by the input devices.

In some embodiments the input device may include a movement detector, such as a dome switch, placed under a platform that includes a position indicator. The device can then use the movement of the platform in making selections. Since this movement can be felt by a user of the device, this configuration allows the device to give tactile feedback to the user while the user is making a selection. This tactile feedback can further be improved by configuring the device to provide a "click" sensation when the platform is depressed.

When the platform is depressed or otherwise moved by a user's finger (or stylus or other device), a movement detector can detect this movement. In this manner, the platform operates as a button. In some embodiments the entire platform may be depressed. In other embodiments, a portion of the platform may be depressed, causing the platform to tilt or "gimbal."

A position indicator can be configured to indicate the position on the platform that has been acted on by the user's finger or other device. Examples of a position indicator include a touch pad and a touch screen. The touch pad or touch screen can be located directly on the platform.

A processor can then be configured to generate a single command that is dependent on both the input from the movement detector and the input from the position indicator. In this manner, different commands can be associated with depressing the platform in different locations, enabling a single platform to provide the functionality of multiple buttons. The platform may also include predetermined zones. An example of a device that includes predetermined button zones can be found in U.S. patent application Ser. No. 11/592,679, entitled "MOVABLE TOUCH PAD WITH ADDED FUNCTIONALITY," filed Nov. 3, 2006, which is hereby incorporated by reference. The processor can then be configured to generate a command that is dependent on the zone in which a user depresses the platform.

Unlike a touch pad or touch screen or non-mechanical sensor alone, this configuration allows the user to receive the tactile feedback associated with buttons while making selections. Further, the number of mechanical movement indicators and the amount of space on a device used for issuing selections can be decreased.

Embodiments of an input device may include a platform suspended on a single flexible member. The flexible member may, for example, be in the shape of a bubble that presses the platform against a housing. The flexible member allows the platform to be tilted 360 degrees about an axis. A movement detector can be configured to detect the movement of the movable platform relative to the housing. The platform also may include a variety of components including a position sensing device to detect the position of a user's finger on the platform when the platform is tilted or depressed.

Examples of devices that may use the input devices described herein include media players, desktop computers, laptop computers, keyboard units, personal digital assistants (PDAs), cellular phones, and remote controls.

BRIEF DESCRIPTION OF THE DRAWINGS

FIG. 1 illustrates an example of a perspective view of an input device according to an embodiment of the present invention.

FIGS. 2A and 2B illustrate an example of simplified side views of an input device having a button touch pad according to an embodiment of the present invention.

FIG. 11 illustrates an example of an exploded perspective diagram of a media player and input device assembly according to an embodiment of the present invention.

FIG. 12 illustrates an example of a side elevation view of the bottom side of a media player containing an input device according to an embodiment of the present invention.

DETAILED DESCRIPTION OF PREFERRED EMBODIMENTS

Figure 3:
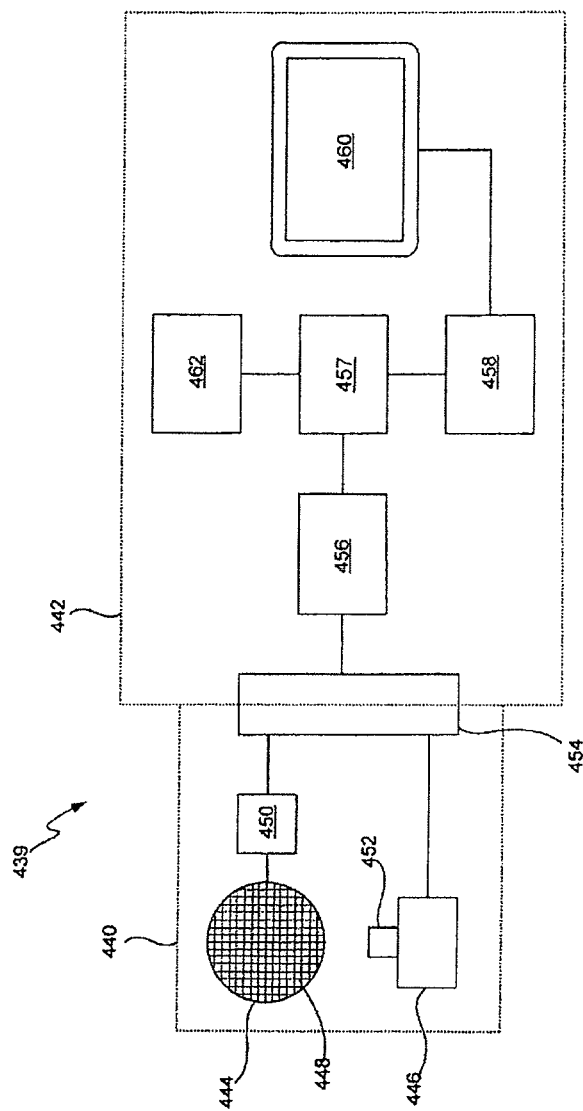
FIG. 3 illustrates an example of a simplified block diagram of an input device connected to a computing device according to an embodiment of the present invention.

The representative embodiments described herein relate to devices that use signals from a movement indicator and a position indicator substantially simultaneously to generate a single command. A platform mounted in a frame of the device can include sensors that can indicate the position of an object, such as a user's finger, in contact with the platform. In addition, a movement indicator on the device can detect movement of the platform relative to the frame.

A user can depress the platform to generate a button command. Since the position of the activation force on the touch pad or touch screen can be determined from the positional indicator, different button commands can be generated depending where on the platform the user depresses the platform.

In the following description of preferred embodiments, reference is made to the accompanying drawings which form a part hereof. It is to be understood that other embodiments may be used and structural changes may be made without departing from the scope of the preferred embodiments. In addition, the following description includes examples that utilize a touch pad as an object sensing device to provide location or other input data. It is understood that reference to a touch pad can also refer to other object sensing devices including (without limitation) touch sensing devices and/or proximity sensing devices, and further including (for example) touch pads, touch screens and/or touch sensing housings.

FIG. 1 illustrates one example of a simplified perspective view of an input device 430. In this example, the input device 430 is generally configured to send information or data to an electronic device in order to perform an action on a display screen (e.g., via a graphical user interface). Examples of actions that may be performed include, moving an input pointer, making a selection, providing instructions, etc. The input device may interact with the electronic device through a wired connection (e.g., cable/connector) or a wireless connection (e.g., IR, Bluetooth, etc.). The input device 430 may be a stand alone unit or it may be integrated into the electronic device. As a stand alone unit, the input device may have its own enclosure. When integrated into an electronic device, the input device typically uses the enclosure of the electronic device. In either case, the input device may be structurally coupled to the enclosure, as for example, through screws, snaps, retainers, adhesives and the like. In some cases, the input device may be removably coupled to the electronic device, as for example, through a docking station. The electronic device to which the input device is coupled may correspond to any consumer related electronic product. By way of example, the electronic device may correspond to a computer such as desktop computer, laptop computer or PDA, a media player such as a music player, a communication device such as a cellular phone, another input device such as a keyboard, and the like.

As shown in FIG. 1, in this embodiment the input device 430 may include a frame 432 (or support structure) and a touch pad 434. The frame 432 provides a structure for supporting the components of the input device. The frame 432 in the form of a housing may also enclose or contain the components of the input device. The components, which include the touch pad 434, may correspond to electrical, optical and/or mechanical components for operating the input device 430.

The touch pad 434 provides location information for an object in contact with or in proximity to the touch pad. This information can be used in combination with information provided by a movement indicator to generate a single command associated with the movement of the touch pad. The touch pad can be used as an input device by itself; for example, the touch pad may be used to move an object or scroll through a list of items on the device.

The touch pad 434 may be widely varied. For example, the touch pad 434 may be a conventional touch pad based on the Cartesian coordinate system, or the touch pad 434 may be a touch pad based on a Polar coordinate system. An example of a touch pad based on polar coordinates may be found in U.S. Pat. No. 7,046,230, entitled "TOUCH PAD FOR HANDHELD DEVICE," which is herein incorporated by reference. Furthermore, the touch pad 434 may be used in at least two different modes, which may be referred to as a relative mode and/or an absolute mode. In absolute mode, the touch pad 434 reports the absolute coordinates of the location at which it is being touched. For example, these would be "x" and "y" coordinates in the case of a standard Cartesian coordinate system or (r,θ) in the case of a Polar coordinate system. In relative mode, the touch pad 434 reports the direction and/or distance of change, for example, left/right, up/down, and the like. In most cases, the signals produced by the touch pad 434 direct movement on the display screen in a direction similar to the direction of the finger as it is moved across the surface of the touch pad 434.

The shape of the touch pad 434 may be widely varied. For example, the touch pad 434 may be circular, oval, square, rectangular, triangular, and the like. In general, the outer perimeter of the touch pad 434 defines the working boundary of the touch pad 434. In the illustrated embodiment, the touch pad is circular. Circular touch pads allow a user to continuously swirl a finger in a free manner, i.e., the finger can be rotated through 360 degrees of rotation without stopping. This form of motion may produce incremental or accelerated scrolling through a list of songs being displayed on a display screen, for example. Furthermore, the user can rotate his or her finger tangentially from all sides, thus providing more finger position range. Both of these features may help when performing a scrolling function. Furthermore, the size of the touch pad 434 generally corresponds to a size that allows it to be easily manipulated by a user (e.g., the size of a finger tip or larger).

The touch pad 434, which generally takes the form of a rigid planar platform, includes a touchable outer surface 436 for receiving a finger (or object) for manipulation of the touch pad. Although not shown in FIG. 1, beneath the touchable outer surface 436 is a sensor arrangement that is sensitive to such things as the pressure and movement of a finger thereon. The sensor arrangement typically includes a plurality of sensors that may be configured to activate as the finger sits on, taps on or passes over them. In the simplest case, an electrical signal is produced each time the finger is positioned over a sensor. The number of signals in a given time frame may indicate location, direction, speed and acceleration of the finger on the touch pad 434, i.e., the more signals, the more the user moved his or her finger. In most cases, the signals are monitored by an electronic interface that converts the number, combination and frequency of the signals into location, direction, speed and acceleration information. This information may then be used by the electronic device to perform the desired control function on the display screen. The sensor arrangement may be widely varied. By way of example, the sensors may be based on resistive sensing, surface acoustic wave sensing, pressure sensing (e.g., strain gauge), optical sensing, capacitive sensing and the like.

In the illustrated embodiment, the touch pad 434 is based on capacitive sensing. A capacitively based touch pad is arranged to detect changes in capacitance as the user moves an object such as a finger around the touch pad. In most cases, the capacitive touch pad includes a protective shield, one or more electrode layers, a circuit board and associated electronics including an application specific integrated circuit (ASIC). The protective shield is placed over the electrodes; the electrodes are mounted on the top surface of the circuit board; and the ASIC is mounted on the bottom surface of the circuit board. The protective shield serves to protect the underlayers and to provide a surface for allowing a finger to slide thereon. The surface is generally smooth so that the finger does not stick to it when moved. The protective shield also provides an insulating layer between the finger and the electrode layers. The electrode layer includes a plurality of spatially distinct electrodes. Any suitable number of electrodes may be used. As the number of electrodes increases, the resolution of the touch pad also increases.

Capacitive sensing works according to the principles of capacitance. As should be appreciated, whenever two electrically conductive members come close to one another without actually touching, their electric fields interact to form capacitance. In the configuration discussed above, the first electrically conductive member is one or more of the electrodes and the second electrically conductive member is the finger of the user. Accordingly, as the finger approaches the touch pad, a tiny capacitance forms between the finger and the electrodes in close proximity to the finger. The capacitance in each of the electrodes is measured by the ASIC located on the backside of the circuit board. By detecting changes in capacitance at each of the electrodes, the ASIC can determine the location, direction, speed and acceleration of the finger as it is moved across the touch pad. The ASIC can also report this information in a form that can be used by the electronic device.

In accordance with one embodiment, the touch pad 434 is movable relative to the frame 432. This movement is detected by a movement detector that generates another control signal. By way of example, the touch pad 434 in the form of the rigid planar platform may rotate, pivot, slide, translate, flex and/or the like relative to the frame 432. The touch pad 434 may be coupled to the frame 432 and/or it may be movably restrained by the frame 432. By way of example, the touch pad 434 may be coupled to the frame 432 through axels, pin joints, slider joints, ball and socket joints, flexure joints, magnets, cushions and/or the like. The touch pad 434 may also float within a space of the frame (e.g., gimbal). It should be noted that the input device 430 may additionally include a combination of joints such as a pivot/translating joint, pivot/flexure joint, pivot/ball and socket joint, translating/flexure joint, and the like to increase the range of movement (e.g., increase the degree of freedom).

When moved, the touch pad 434 is configured to actuate a movement detector circuit that generates one or more signals. The circuit generally includes one or more movement detectors such as switches, sensors, encoders, and the like.

In the illustrated embodiment, the touch pad 434 is part of a depressible platform. The touch pad operates as a button and performs one or more mechanical clicking actions. Multiple functions of the device can be accessed by depressing the touch pad 434 in different locations. A movement detector signals that the touch pad 434 has been depressed, and the touch pad 434 signals a location on the platform that has been touched. By combining both the movement detector signals and the touch pad signals, the touch pad 434 acts like multiple buttons such that depressing the touch pad at different locations corresponds to different buttons. As shown in FIGS. 2A and 2B, according to one embodiment the touch pad 434 is capable of moving between an upright position (FIG. 2A) and a depressed position (FIG. 2B) when a substantial force from a finger 438, palm, hand or other object is applied to the touch pad 434. The touch pad 434 is typically spring biased in the upright position, as for example through a spring member. The touch pad 434 moves to the depressed position when the spring bias is overcome by an object pressing on the touch pad 434.

As shown in FIG. 2A, the touch pad 434 generates tracking signals when an object such as a user's finger is moved over the top surface of the touch pad in the x, y plane. As shown in FIG. 2B, in the depressed position (z direction), the touch pad 434 generates both positional information and a movement indicator generates a signal indicating that the touch pad 434 has moved. The positional information and the movement indication are combined to form a button command. Different button commands can correspond to depressing the touch pad 434 in different locations. The different button commands may be used for various functionalities including, but not limited to, making selections or issuing commands associated with operating an electronic device. By way of example, in the case of a music player, the button commands may be associated with opening a menu, playing a song, fast forwarding a song, seeking through a menu and the like.

To elaborate, the touch pad 434 is configured to actuate a movement detector, which together with the touch pad positional information, forms a button command when the touch pad 434 is moved to the depressed position. The movement detector is typically located within the frame 432 and may be coupled to the touch pad 434 and/or the frame 432. The movement detector may be any combination of switches and sensors. Switches are generally configured to provide pulsed or binary data such as activate (on) or deactivate (off). By way of example, an underside portion of the touch pad 434 may be configured to contact or engage (and thus activate) a switch when the user presses on the touch pad 434. The sensors, on the other hand, are generally configured to provide continuous or analog data. By way of example, the sensor may be configured to measure the position or the amount of tilt of the touch pad 434 relative to the frame when a user presses on the touch pad 434. Any suitable mechanical, electrical and/or optical switch or sensor may be used. For example, tact switches, force sensitive resistors, pressure sensors, proximity sensors, and the like may be used. In some case, the spring bias for placing the touch pad 434 in the upright position is provided by a movement detector that includes a spring action.

FIG. 3 illustrates an example of a simplified block diagram of a computing system 439. The computing system generally includes an input device 440 operatively connected to a computing device 442. By way of example, the input device 440 may generally correspond to the input device 430 shown in FIGS. 1, 2A and 2B, and the computing device 442 may correspond to a computer, PDA, media player or the like. As shown, the input device 440 includes a depressible touch pad 444 and one or more movement detectors 446. The touch pad 444 is configured to generate tracking signals and the movement detector 446 is configured to generate a movement signal when the touch pad is depressed. Although the touch pad 444 may be widely varied, in this embodiment, the touch pad 444 includes capacitance sensors 448 and a control system 450 for acquiring the position signals from the sensors 448 and supplying the signals to the computing device 442. The control system 450 may include an application specific integrated circuit (ASIC) that is configured to monitor the signals from the sensors 448, to compute the angular location, direction, speed and acceleration of the monitored signals and to report this information to a processor of the computing device 442. The movement detector 446 may also be widely varied. In this embodiment, however, the movement detector 446 takes the form of a switch that generates a movement signal when the touch pad 444 is depressed. The switch 446 may correspond to a mechanical, electrical or optical style switch. In one particular implementation, the switch 446 is a mechanical style switch that includes a protruding actuator 452 that may be pushed by the touch pad 444 to generate the movement signal. By way of example, the switch may be a tact or dome switch.

Both the touch pad 444 and the switch 446 are operatively coupled to the computing device 442 through a communication interface 454. The communication interface provides a connection point for direct or indirect connection between the input device and the electronic device. The communication interface 454 may be wired (wires, cables, connectors) or wireless (e.g., transmitter/receiver).

Referring to the computing device 442, the computing device 442 generally includes a processor 457 (e.g., CPU or microprocessor) configured to execute instructions and to carry out operations associated with the computing device 442. For example, using instructions retrieved from memory, the processor may control the reception and manipulation of input and output data between components of the computing device 442. The processor 457 is configured to receive input from both the switch 446 and the touch pad 444 and form a single command that is dependent upon both of these inputs. In most cases, the processor 457 executes instruction under the control of an operating system or other software. The processor 457 can be a single-chip processor or can be implemented with multiple components.

The computing device 442 also includes an input/output (I/O) controller 456 that is operatively coupled to the processor 457. The (I/O) controller 456 may be integrated with the processor 457 or it may be a separate component as shown. The I/O controller 456 is generally configured to control interactions with one or more I/O devices that can be coupled to the computing device 442, as for example the input device 440. The I/O controller 456 generally operates by exchanging data between the computing device 442 and I/O devices that desire to communicate with the computing device 442.

The computing device 442 also includes a display controller 458 that is operatively coupled to the processor 457. The display controller 458 may be integrated with the processor 457 or it may be a separate component as shown. The display controller 458 is configured to process display commands to produce text and graphics on a display screen 460. By way of example, the display screen 460 may be a monochrome display, color graphics adapter (CGA) display, enhanced graphics adapter (EGA) display, variable-graphics-array (VGA) display, super VGA display, liquid crystal display (e.g., active matrix, passive matrix and the like), cathode ray tube (CRT), plasma displays and the like. In the illustrated embodiment, the display device corresponds to a liquid crystal display (LCD).

In most cases, the processor 457 together with an operating system operates to execute computer code and produce and use data. The computer code and data may reside within a program storage area 462 that is operatively coupled to the processor 457. Program storage area 462 generally provides a place to hold data that is being used by the computing device 442. By way of example, the program storage area may include Read-Only Memory (ROM), Random-Access Memory (RAM), hard disk drive and/or the like. The computer code and data could also reside on a removable program medium and loaded or installed onto the computing device when needed. In one embodiment, program storage area 462 is configured to store information for controlling how the tracking and movement signals generated by the input device are used in combination by the computing device 442 to generate a single button command.

Figure 4:
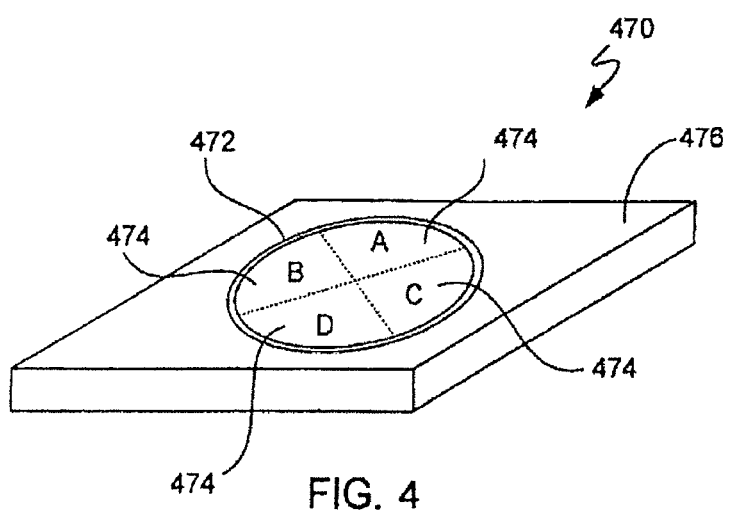
FIG. 4 illustrates an example of a simplified perspective diagram of an input device according to an embodiment of the present invention.

FIG. 4 is a simplified perspective diagram of an input device 470. Like the input device shown in the embodiment of FIGS. 2A and 2B, this input device 470 incorporates the functionality of a button (or buttons) directly into the touch pad 472, i.e., the touch pad acts like a button. In this embodiment, however, the touch pad 472 is divided into a plurality of independent and spatially distinct button zones

474. The button zones 474 represent regions of the touch pad 472 that may be moved by a user to implement distinct button functions. The dotted lines represent areas of the touch pad 472 that make up an individual button zone. Any number of button zones may be used, for example, two or more, four, eight, etc. In the illustrated embodiment, the touch pad 472 includes four button zones 474 (i.e., zones A-D).

As should be appreciated, the button functions generated by pressing on each button zone may include selecting an item on the screen, opening a file or document, executing instructions, starting a program, viewing a menu, and/or the like. The button functions may also include functions that make it easier to navigate through the electronic system, as for example, zoom, scroll, open different menus, home the input pointer, perform keyboard related actions such as enter, delete, insert, page up/down, and the like. In the case of a music player, one of the button zones may be used to access a menu on the display screen, a second button zone may be used to seek forward through a list of songs or fast forward through a currently playing song, a third button zone may be used to seek backwards through a list of songs or fast rearward through a currently playing song, and a fourth button zone may be used to pause or stop a song that is being played.

To elaborate, the touch pad 472 is capable of moving relative to the frame 476 so as to create a clicking action. The frame 476 may be formed from a single component or it may be a combination of assembled components. The clicking action actuates a movement detector contained inside the frame 476. The movement detector is configured to sense movements of the button zones during the clicking action and to send a signal corresponding to the movement to the electronic device. By way of example, the movement detectors may be switches, sensors and/or the like.

In addition, the touch pad 472 is configured to send positional information on what button zone is being acted on when the clicking action occurs. The positional information allows to device to determine which button zone is being activated when the touch pad is moved relative to the frame.

The movements of each of the button zones 474 may be provided by various rotations, pivots, translations, flexes and the like. In one embodiment, the touch pad 472 is configured to gimbal relative to the frame 476. By gimbal, it is generally meant that the touch pad 472 is able to float in space relative to the frame 476 while still being constrained thereto. The gimbal may allow the touch pad 472 to move in single or multiple degrees of freedom (DOF) relative to the housing, for example, movements in the x, y and/or z directions and/or rotations about the x, y, and/or z axes ($\theta_x, \theta_y, \theta_z$).

Figure 5A:
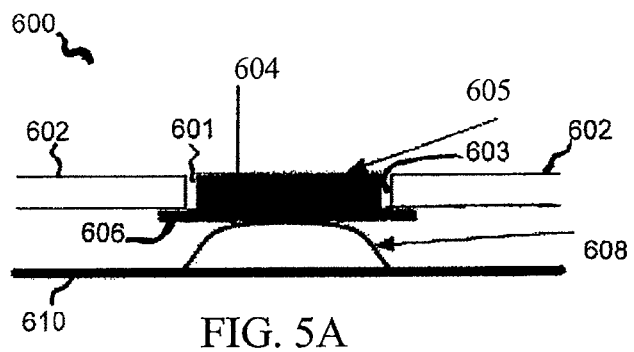
FIGS. 5A-5C illustrate an example of a side view, in cross section, of an input device according to an embodiment of the present invention.
Figure 5B:
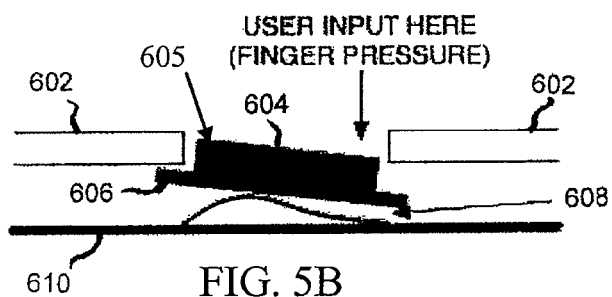
Figure 5C:
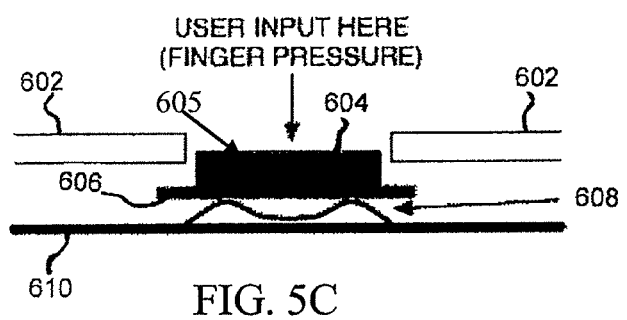

FIGS. 5A-5C show a particular implementation of a input device 600. The input device 600 includes a touch pad 605 mounted on a gimbal plate 604. The gimbal plate is held within a space 601 in a housing with top plate 602. The gimbal plate 604 lies on top of a single flexible member 608.

One or more movement detectors are activated by the movement of gimbal plate 605. For example, one or more movement detectors can be positioned around or on gimbal plate 608 and can be activated by the tilt or other desired movement of gimbal plate 608. Flexible member 608 can be part of the movement detector, for example the dome on a SMT dome switch.

The flexible member 608 can be formed in a bubble shape that provides the spring force to push the gimbal plate into mating engagement with the top wall of frame 602 and away from supportive surface 608. Tab 606 protrudes from the side of gimbal plate 606 and extends under top plate 602.

The gimbal plate is allowed to float within cutout 601. The shape of the space 601 generally coincides with the shape of the gimbal plate 604. As such, the unit is substantially restrained along the x and y axes via a side wall 603 of the top plate 602 and along the z axis via engagement of top plate 602 and tab 606 on gimbal plate 604. Gimbal plate 604 is thus capable of moving within space 601 while still being prevented from moving entirely out of the space 601 via the walls of the top plate 602.

With respect to FIGS. 5B and 5C, according to one embodiment, a user presses on the gimbal plate 604 in the location of the desired button function. As shown in FIG. 5B, if the user presses on the side of the gimbal plate 604, the gimbal plate tilts. Tab 606 and supportive surface 610 limit the amount of tilt of the gimbal plate. The gimbal plate may be tilted about an axis in a 360 degree pattern around the gimbal plate. One or more movement detectors can be positioned to monitor the movement of the gimbal plate.

5C shows that if the user presses down on the center of the gimbal plate 604, the gimbal plate moves down into the housing without tilting. The gimbal plate is nonetheless still restrained within the housing by the walls of top plate 602.

Touch pad 605, mounted on gimbal plate 604, provides the position of the user's finger when gimbal plate 604 is pressed. This positional information is used by the device to determine what button function is desired by the user. For example, the interface may be divided into distinct button zones as shown in FIG. 4. In this instance, activation of a single movement detector that monitors the movement of gimbal plate 604 can be used to provide several button commands. For example, a first signal generated by touch pad 605 on gimbal plate 604 may generate a first signal that indicates the position of the user's finger on the gimbal plate. A movement detector such as a dome switch can then be used to generate a second signal that indicates that the gimbal plate has been moved, for example, depressed.

The input device including the gimbal plate and a touch pad can be part of a computer system 439 as shown in FIG. 3. The communication interface 454 can provide the first and second signals provided by the touch pad and the movement detector respectively to computing device 442 including a processor 454. The processor can then determine which command is associated with the combination of the first and second signals. In this manner, activating the movement detector by pressing on the touch pad in different positions can correspond to different actions and a single movement detector can be used to provide the functionality of multiple buttons positioned around the gimbal plate 604.

By using a touch pad and the gimbal plate as configured in FIGS. 5A-5C, multiple button functions can be accessed with a single movement detector. This can be used to produce a device with fewer parts as compared to devices that use a different movement detector to produce each button command.

Having only a single movement detector positioned under the gimbal plate also improves the tactile feel of the input device. A user of the device will feel only a single click on any part of the gimbal plate the user presses. Having multiple mechanical switch type movement detectors under a gimbal plate can result in a "crunching" type feel in which the user feels multiple clicks in series when they press down on the gimbal plate.

Figure 6A:
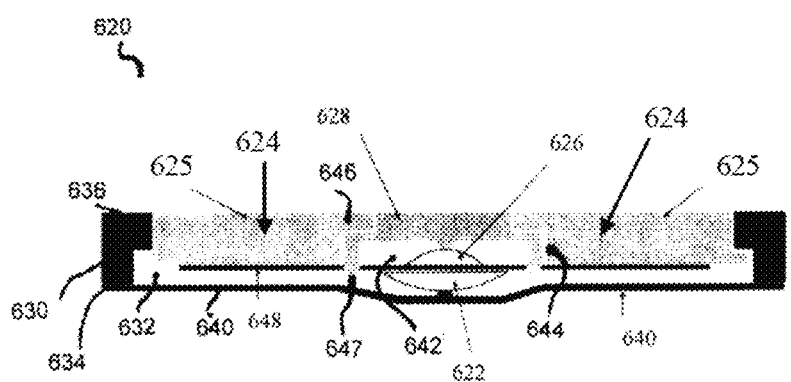
FIGS. 6A-6C illustrate an example of a side view, in cross section, of an input device according to an embodiment of the present invention.
Figure 6B:
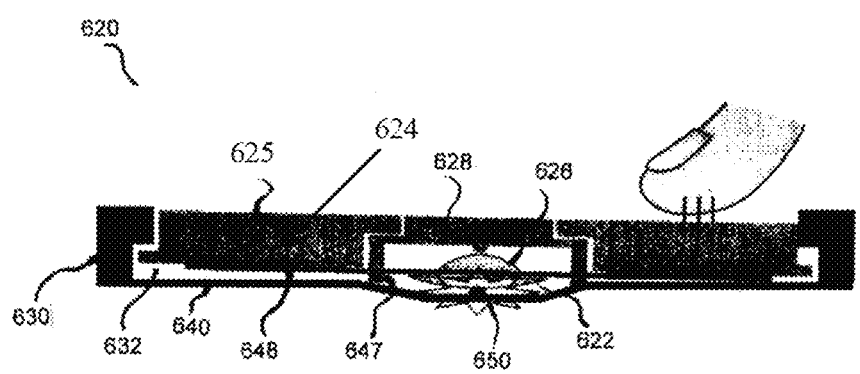
Figure 6C:
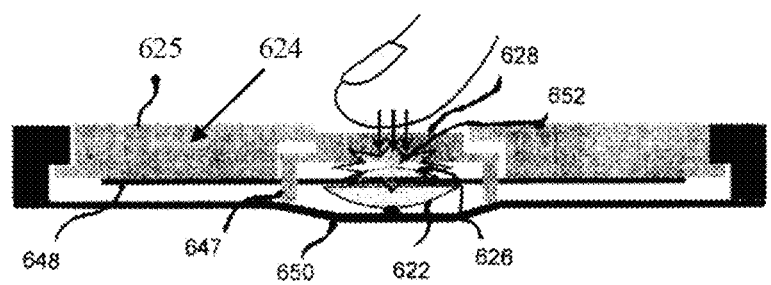

FIGS. 6A-6C show a side cross section of an embodiment of an input device 620 that uses two dome switches. One dome switch 622 is activated by a user pressing anywhere around the click wheel 624, and the second dome switch 626 is activated by depressing the center button 628.

FIGS. 6A-6C show a cross section of a round click wheel 624 that surrounds center button 628, which is positioned in the center of the click wheel. The click wheel 624 includes a touch pad 625. The click wheel 624 is configured to gimbal relative to the frame 630 in order to provide a clicking action for any position on the click wheel 624.

The click wheel 624 is restrained within a space 632 provided in the frame 630. The click wheel 624 is capable of moving within the space 632 while still being prevented from moving entirely out of the space 632 via the walls of the frame 630. The shape of the space 632 generally coincides with the shape of the click wheel 624. As such, the unit is substantially restrained along the x and y axes via a side wall 634 of the frame 630 and along the z axis via a top wall 636 and a bottom wall 640 of the frame 630. A small gap may be provided between the side walls and the platform to allow the touch pad to gimbal 360 degrees around its axis without obstruction (e.g., a slight amount of play). In some cases, the platform may include tabs that extend along the x and y axes so as to prevent rotation about the z axis.

The center button 628 is positioned within a space 642 in the click wheel 624. The center button 628 is constrained within space 642 along the x and y axes via side wall 644 of click wheel 624 and along the z axis by tabs 646 of click wheel 646 and by bottom wall 640, which connects with legs 647 of center button 628 when the center button is pressed.

Positioned beneath the center button 628 are two dome switches 622 and 626. The two dome switches provide the mechanical spring action for center button 628 and click wheel 624. A rigid plate 648 is positioned between the two dome switches. The rigid plate 648 extends through holes in legs 647 and under click wheel 624. In this manner, the rigid plate transmits the spring force of dome switches 622 and 626 to the click wheel 624 and the rigid plate transmits any force supplied by a user to click wheel 624 to dome switch 622.

FIG. 6B shows how only click wheel dome switch 622 is activated when a user depresses click wheel 624. When a user depresses anywhere on the click wheel 624, the click wheel gimbals in the area 632 and the force of the user pressing down is conveyed to inverted dome switch 622 by rigid plate 648 and bottom wall 640. Bottom wall 640 may include a nub 650 for conveying the force of the click to the center of the dome switch 622. Center button dome switch 626 does not actuate since it pivots together with the click wheel 624. The clearance between the center button 628 and the snap dome below it remains constant as it pivots together with the wheel.

FIG. 6C shows how only the center dome switch is activated when the center button 628 is depressed. The feet 647 of center button 628 prevent the button 628 from exceeding the travel of the upper dome 626. To ensure that only the upper dome 626 is actuated, the actuation force of the lower dome 622 is higher than the actuation force of the top dome 626. The button 628 may include a nub 652 for conveying the force of the click to the center of the dome switch 626.

As with the configuration described with respect to FIGS. 5A-5C, signals from a touch pad 625 that forms part of click wheel 624 were used in combination with the signal from the activation of click dome switch 622 to simulate several buttons mounted in different areas around click wheel 624. This configuration, however, allows for a separate center button to be used. This can be particularly useful when a touch pad that only senses angular position is used in the click wheel 624. When only angular position is measured, a center button can not be simulated since the position of the user's finger relative to the center of the click wheel 624 is not measured.

Although not shown, the touch pad may be back lit in some cases. For example, the circuit board can be populated with light emitting diodes (LEDs) on either side in order to designate button zones, provide additional feedback and the like.

Figure 7:
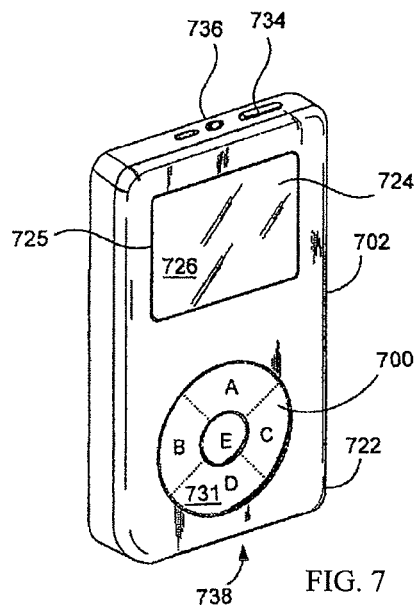
FIG. 7 illustrates an example of a perspective diagram of a media player according to an embodiment of the present invention.
Figure 8:
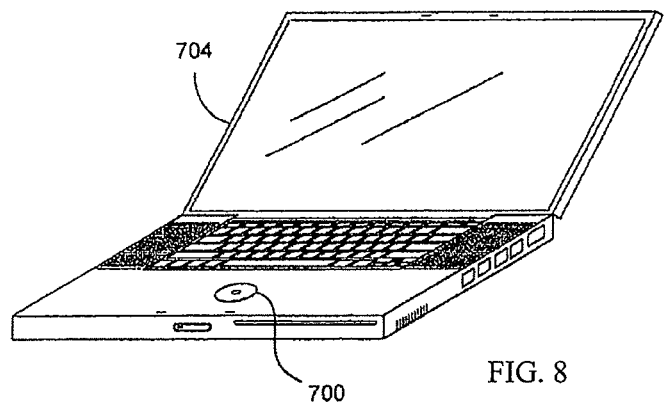
FIG. 8 illustrates an example of a perspective diagram of a laptop computer according to an embodiment of the present invention.
Figure 9:
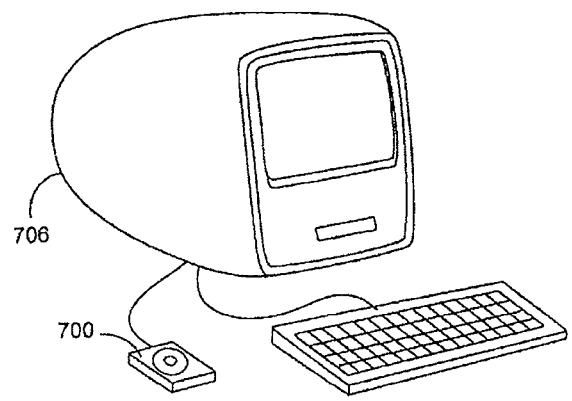
FIG. 9 illustrates an example of a perspective diagram of a desktop computer with a peripheral input device connected thereto according to an embodiment of the present invention.
Figure 10:
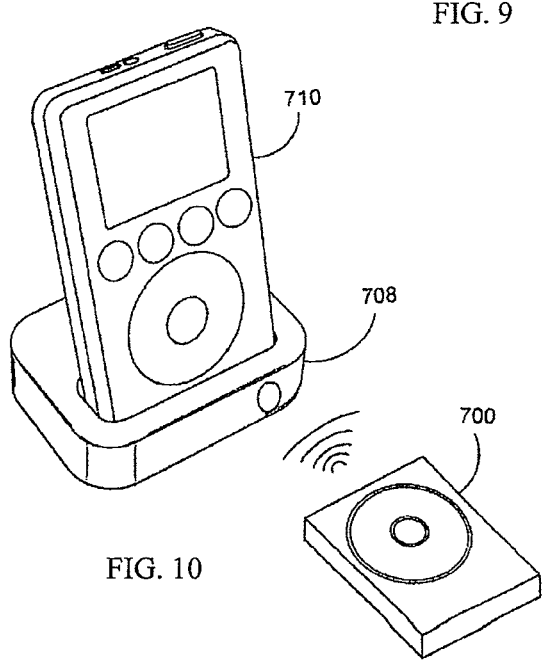
FIG. 10 illustrates an example of a perspective diagram of a remote control using an input device according to an embodiment of the present invention.

As previously mentioned, the input devices described herein may be integrated into an electronic device or they may be separate stand alone devices. FIGS. 7 and 8 show some implementations of an input device 700 integrated into an electronic device. In FIG. 7, the input device 700 is incorporated into a media player 702. In FIG. 8, the input device 700 is incorporated into a laptop computer 704. FIGS. 9 and 10, on the other hand, show some implementations of the input device 700 as a stand alone unit. In FIG. 9, the input device 700 is a peripheral device that is connected to a desktop computer 706. In FIG. 10, the input device 700 is a remote control that wirelessly connects to a docking station 708 with a media player 710 docked therein. It should be noted, however, that the remote control can also be configured to interact with the media player (or other electronic device) directly thereby eliminating the need for a docking station. An example of a docking station for a media player can be found in U.S. patent application Ser. No. 10/423,490, entitled "MEDIA PLAYER SYSTEM," filed Apr. 25, 2003, which is hereby incorporated by reference. It should be noted that these particular embodiments are not a limitation and that many other devices and configurations may be used.

Referring back to FIG. 7, the media player 702 will be discussed in greater detail. The term "media player" generally refers to computing devices that may be dedicated to processing media such as audio, video or other images, as for example, music players, game players, video players, video recorders, cameras, and the like. In some cases, the media players contain single functionality (e.g., a media player dedicated to playing music) and in other cases the media players contain multiple functionality (e.g., a media player that plays music, displays video, stores pictures and the like). In either case, these devices are generally portable so as to allow a user to listen to music, play games or video, record video or take pictures wherever the user travels.

In one embodiment, the media player is a handheld device that is sized for placement into a pocket of the user. By being pocket sized, the user does not have to directly carry the device and therefore the device can be taken almost anywhere the user travels (e.g., the user is not limited by carrying a large, bulky and often heavy device, as in a laptop or notebook computer). For example, in the case of a music player, a user may use the device while working out at the gym. In case of a camera, a user may use the device while mountain climbing. In the case of a game player, the user may use the device while traveling in a car. Furthermore, the device may be operated by the user's hands. No reference surface, such as a desktop, is needed. In the illustrated embodiment, the media player 702 is a pocket sized hand held MP3 music player that allows a user to store a large collection of music (e.g., in some cases up to 4,000 CD-quality songs). By way of example, the MP3 music player may correspond to the iPod brand MP3 player manufactured by Apple Inc. of Cupertino, Calif. Although used primarily for storing and playing music, the MP3 music player shown herein may also include additional functionality such as storing a calendar and phone lists, storing and playing games, storing photos and the like. In fact, in some cases, it may act as a highly transportable storage device.

As shown in FIG. 7, the media player 702 includes a housing 722 that encloses various electrical components (including integrated circuit chips and other circuitry) internally to provide computing operations for the media player 702. In addition, the housing 722 may also define the shape or form of the media player 702. That is, the contour of the housing 722 may embody the outward physical appearance of the media player 702. The integrated circuit chips and other circuitry contained within the housing 722 may include a microprocessor (e.g., CPU), memory (e.g., ROM, RAM), a power supply (e.g., battery), a circuit board, a hard drive, other memory (e.g., flash) and/or various input/output (I/O) support circuitry. The electrical components may also include components for inputting or outputting music or sound such as a microphone, amplifier and a digital signal processor (DSP). The electrical components may also include components for capturing images such as image sensors (e.g., charge coupled device (CCD) or complimentary metal-oxide semiconductor (CMOS)) or optics (e.g., lenses, splitters, filters).

In the illustrated embodiment, the media player 702 includes a hard drive thereby giving the media player massive storage capacity. For example, a 20 GB hard drive can store up to 4000 songs or about 266 hours of music. In contrast, flash-based media players on average store up to 128 MB, or about two hours, of music. The hard drive capacity may be widely varied (e.g., 5, 10, 20 GB, etc.). In addition to the hard drive, the media player 702 shown herein also includes a battery such as a rechargeable lithium polymer battery. These types of batteries are capable of offering about 10 hours of continuous playtime to the media player.

The media player 702 also includes a display screen 724 and related circuitry. The display screen 724 is used to display a graphical user interface as well as other information to the user (e.g., text, objects, graphics). By way of example, the display screen 724 may be a liquid crystal display (LCD). In one particular embodiment, the display screen corresponds to a 160-by-128-pixel high-resolution display, with a white LED backlight to give clear visibility in daylight as well as low-light conditions. As shown, the display screen 724 is visible to a user of the media player 702 through an opening 725 in the housing 722 and through a transparent wall 726 that is disposed in front of the opening 725. Although transparent, the transparent wall 726 may be considered part of the housing 722 since it helps to define the shape or form of the media player 702.

The media player 702 also includes the touch pad 700 such as any of those previously described. The touch pad 700 generally consists of a touchable outer surface 731 for receiving a finger for manipulation on the touch pad 730. Although not shown in FIG. 7, beneath the touchable outer surface 731 is a sensor arrangement. The sensor arrangement includes a plurality of sensors that may be configured to activate as the finger sits on, taps on or passes over them. In the simplest case, an electrical signal is produced each time the finger is positioned over a sensor. The number of signals in a given time frame may indicate location, direction, speed and acceleration of the finger on the touch pad, i.e., the more signals, the more the user moved his or her finger. In most cases, the signals are monitored by an electronic interface that converts the number, combination and frequency of the signals into location, direction, speed and acceleration information. This information may then be used by the media player 702 to perform the desired control function on the display screen 724. For example, a user may easily scroll through a list of songs by swirling the finger around the touch pad 700.

In addition to above, the touch pad may also include one or more movable buttons zones A-D as well as a center button E. The button zones are configured to provide one or more dedicated control functions for making selections or issuing commands associated with operating the media player 702. By way of example, in the case of an MP3 music player, the button functions may be associated with opening a menu, playing a song, fast forwarding a song, seeking through a menu, making selections and the like. In most cases, the button functions are implemented via a mechanical clicking action.

The position of the touch pad 700 relative to the housing 722 may be widely varied. For example, the touch pad 700 may be placed at any external surface (e.g., top, side, front, or back) of the housing 722 that is accessible to a user during manipulation of the media player 702. In most cases, the touch sensitive surface 731 of the touch pad 700 is completely exposed to the user. In the embodiment illustrated in FIG. 7, the touch pad 700 is located in a lower front area of the housing 722. Furthermore, the touch pad 700 may be recessed below, level with, or extend above the surface of the housing 722. In the embodiment illustrated in FIG. 7, the touch sensitive surface 731 of the touch pad 700 is substantially flush with the external surface of the housing 722.

The shape of the touch pad 700 may also be widely varied. Although shown as circular, the touch pad may also be square, rectangular, triangular, and the like. More particularly, the touch pad is annular, i.e., shaped like or forming a ring. As such, the inner and outer perimeter of the touch pad defines the working boundary of the touch pad.

The media player 702 may also include a hold switch 734. The hold switch 734 is configured to activate or deactivate the touch pad and/or buttons associated therewith. This is generally done to prevent unwanted commands by the touch pad and/or buttons, as for example, when the media player is stored inside a user's pocket. When deactivated, signals from the buttons and/or touch pad are not sent or are disregarded by the media player. When activated, signals from the buttons and/or touch pad are sent and therefore received and processed by the media player.

Moreover, the media player 702 may also include one or more headphone jacks 736 and one or more data ports 738. The headphone jack 736 is capable of receiving a headphone connector associated with headphones configured for listening to sound being outputted by the media device 702. The data port 738, on the other hand, is capable of receiving a data connector/cable assembly configured for transmitting and receiving data to and from a host device such as a general purpose computer (e.g., desktop computer, portable computer). By way of example, the data port 738 may be used to upload or download audio, video and other images to and from the media device 702. For example, the data port may be used to download songs and play lists, audio books, ebooks, photos, and the like into the storage mechanism of the media player.

The data port 738 may be widely varied. For example, the data port may be a PS/2 port, a serial port, a parallel port, a USB port, a Firewire port and/or the like. In some cases, the data port 738 may be a radio frequency (RF) link or optical infrared (IR) link to eliminate the need for a cable. Although not shown in FIG. 7, the media player 702 may also include a power port that receives a power connector/cable assembly configured for delivering power to the media player 702. In some cases, the data port 738 may serve as both a data and power port. In the illustrated embodiment, the data port 738 is a Firewire port having both data and power capabilities.

Although only one data port is shown, it should be noted that this is not a limitation and that multiple data ports may be incorporated into the media player. In a similar vein, the data port may include multiple data functionality, i.e., integrating the functionality of multiple data ports into a single data port. Furthermore, it should be noted that the position of the hold switch, headphone jack and data port on the housing may be widely varied. That is, they are not limited to the positions shown in FIG. 7. They may be positioned almost anywhere on the housing (e.g., front, back, sides, top, bottom). For example, the data port may be positioned on the top surface of the housing rather than the bottom surface as shown.

FIGS. 11 and 12 are diagrams showing the installation of an input device 750 into a media player 752. By way of example, the input device 750 may correspond to any of those previously described and the media player 752 may correspond to the one shown in FIG. 7. As shown, the input device 750 includes a housing 754 and a touch pad assembly 756. The media player 752 includes a shell or enclosure 758. The front wall 760 of the shell 758 includes an opening 762 for allowing access to the touch pad assembly 756 when the input device 750 is introduced into the media player 752. The inner side of the front wall 760 includes a channel or track 764 for receiving the input device 750 inside the shell 758 of the media player 752. The channel 764 is configured to receive the edges of the housing 754 of the input device 750 so that the input device 750 can be slid into its desired place within the shell 758. The shape of the channel has a shape that generally coincides with the shape of the housing 754. During assembly, the circuit board 766 of the touch pad assembly 756 is aligned with the opening 762 and a cosmetic disc 768 and button cap 770 are mounted onto the top side of the circuit board 766. As shown, the cosmetic disc 768 has a shape that generally coincides with the opening 762. The input device may be held within the channel via a retaining mechanism such as screws, snaps, adhesives, press fit mechanisms, crush ribs and the like.

Figure 13:
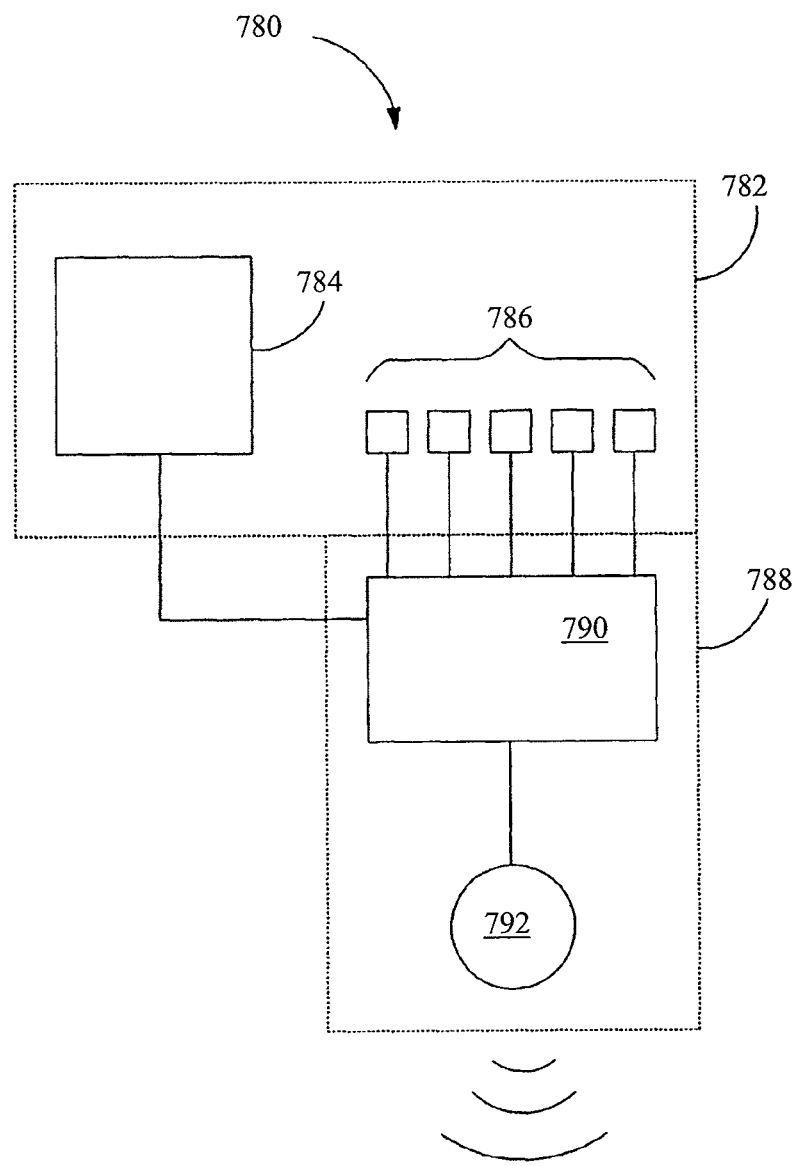
FIG. 13 illustrates an example of a simplified block diagram of a remote control according to an embodiment of the present invention.

FIG. 13 is a simplified block diagram of a remote control 780 incorporating an input device 782 therein. By way of example, the input device 782 may correspond to any of the previously described input devices. In this particular embodiment, the input device 782 corresponds to the input device shown in FIGS. 5 and 6, thus the input device includes a touch pad 784 and a plurality of switches 786. The touch pad 784 and switches 786 are operatively coupled to a wireless transmitter 788. The wireless transmitter 788 is configured to transmit information over a wireless communication link so that an electronic device that has receiving capabilities may receive the information over the wireless communication link. The wireless transmitter 788 may be widely varied. For example, it may be based on wireless technologies such as FM, RF, Bluetooth, 802.11 UWB (ultra wide band), IR, magnetic link (induction) and/or the like. In the illustrated embodiment, the wireless transmitter 788 is based on IR. IR generally refers to wireless technologies that convey data through infrared radiation. As such, the wireless transmitter 788 generally includes an IR controller 790. The IR controller 790 takes the information reported from the touch pad 784 and switches 786 and converts this information into infrared radiation, as for example using a light emitting diode 792.

Although the various exemplary embodiments have been fully described with reference to the accompanying drawings, it is to be noted that various changes and modifications will become apparent to those skilled in the art. Such changes and modifications are to be understood as being included within the scope of the subject matter defined by the appended claims.

What is claimed is:

1. A handheld electronic device comprising:
a frame and a platform,
the platform comprising a first region and a second region,
the first region being positioned in the second region,
the second region comprising a touch sensitive surface,
the first region being moveable relative to the second region to activate a first switch, and
the second region being movable to activate a second switch and at least one of a first function uniquely associated with a first touch-sensitive zone on the second region and the second switch and a second function uniquely associated with a second touch-sensitive zone on the second region and the second switch, the first function and the second function being non-identical,
wherein the second region is configured such that pressing the first touch-sensitive zone activates the second switch, and detecting a touch at the first touch-sensitive zone overlapping in time with the activation of the second switch enables at least the first function but not the second function, and wherein the second region is further configured such that pressing the second touch-sensitive zone activates the second switch, and detecting a touch at the second touch-sensitive zone overlapping in time with the activation of the second switch enables at least the second function but not the first function.

2. The device of claim 1 wherein the platform is moveable relative to the frame.

3. The device of claim 1 wherein the first region comprises a center button, the second region comprises a click wheel, and the touch sensitive surface comprises a touch pad or a touch screen.

4. The device of claim 1 comprising a sensor configured to sense force applied to the platform.

5. The device of claim 4 wherein the sensor comprises at least one of a force sensitive resistor, a pressure sensor and a proximity sensor.

6. The device of claim 1 comprising a sensor configured to produce a signal when a finger is positioned over the sensor.

7. The device of claim 1 comprising a sensor configured to activate as a finger touches the sensor.

8. The device of claim 1 wherein the touch sensitive surface comprises a unitary touchable outer surface.

9. The device of claim 1, wherein the second region further comprises at least a third touch-sensitive zone and a fourth touch-sensitive zone, wherein pressing the third touch-sensitive zone activates the second switch and wherein pressing the fourth touch-sensitive zone activates the second switch.

10. An input device, comprising:
a first touch-sensitive means;
a second touch-sensitive means formed around the first touch-sensitive means;
wherein the first touch-sensitive means is moveable relative to the second touch-sensitive means to activate a first switching means;
wherein the second touch-sensitive means is movable to activate a second switching means and at least one of a first function uniquely associated with a first touch-sensitive zone on the second touch-sensitive means and the second switching means and a second function uniquely associated with a second touch-sensitive zone on the second touch-sensitive means and the second switching means, the first function and the second function being non-identical;

wherein the second touch-sensitive means is configured such that pressing the first touch-sensitive zone activates the second switching means, and detecting a touch at the first touch-sensitive zone partially overlapping in time with the activation of the second switching means enables at least the first function but not the second function, and wherein the second touch-sensitive means is further configured such that pressing the second touch-sensitive zone activates the second switching means, and detecting a touch at the second touch-sensitive zone overlapping in time with the activation of the second switching means enables at least the second function but not the first function.

11. The input device of claim 10, wherein the first touch-sensitive means comprises a center button, and the second touch-sensitive means comprises a click wheel.

12. The input device of claim 10, further comprising force sensing means configured to sense force applied to the input device.

13. The input device of claim 12, wherein the force sensing means comprises at least one of a force sensitive resistor, a pressure sensor and a proximity sensor.

14. The input device of claim 10, further comprising an object sensing means configured to produce a signal when a finger is positioned over the object sensing means.

15. The input device of claim 10, further comprising an object sensing means configured to activate as a finger touches the object sensing means.

16. The input device of claim 10, wherein the second touch-sensitive means comprises a unitary touchable outer surface.

17. The input device of claim 10, wherein the second touch-sensitive means further comprises at least a third touch-sensitive zone and a fourth touch-sensitive zone, wherein pressing the third touch-sensitive zone activates the second switching means and wherein pressing the fourth touch-sensitive zone activates the second switching means.

* * * * *